(12) United States Patent
Fornell et al.

(10) Patent No.: US 12,023,599 B2
(45) Date of Patent: Jul. 2, 2024

(54) MOBILE HUB

(71) Applicant: HB Innovations, Inc., Los Angeles, CA (US)

(72) Inventors: Peter Fornell, Los Angeles, CA (US); Joseph J. Kopp, Jr., Los Angeles, CA (US); Adi Orucevic, Los Angeles, CA (US)

(73) Assignee: HB Innovations, Inc., Los Angeles, CA (US)

( * ) Notice: Subject to any disclaimer, the term of this patent is extended or adjusted under 35 U.S.C. 154(b) by 142 days.

(21) Appl. No.: 17/696,404

(22) Filed: Mar. 16, 2022

(65) Prior Publication Data

US 2022/0297020 A1    Sep. 22, 2022

Related U.S. Application Data

(60) Provisional application No. 63/161,627, filed on Mar. 16, 2021.

(51) Int. Cl.
| | |
|---|---|
| A63H 33/00 | (2006.01) |
| A47D 15/00 | (2006.01) |
| F16M 11/04 | (2006.01) |

(52) U.S. Cl.
CPC ........... *A63H 33/006* (2013.01); *A47D 15/00* (2013.01); *F16M 11/04* (2013.01)

(58) Field of Classification Search
CPC ........... A63H 1/18; A63H 1/20; A63H 3/006; A63H 33/006
See application file for complete search history.

(56) References Cited

U.S. PATENT DOCUMENTS

| | | | | |
|---|---|---|---|---|
| 2,994,156 | A * | 8/1961 | Steiner | A63H 33/006 446/268 |
| 3,762,084 | A * | 10/1973 | Jones | A63H 33/40 428/7 |
| 5,352,145 | A | 10/1994 | Raiffe et al. | |
| 6,089,944 | A | 7/2000 | Bergkvist | |
| 6,464,555 | B1 * | 10/2002 | Paduano | A63H 33/006 446/228 |
| 6,591,529 | B1 * | 7/2003 | Lane | G09F 1/10 40/617 |
| 6,938,291 | B1 | 9/2005 | Cheng | |
| 7,476,142 | B2 * | 1/2009 | Mastrosimone-Gese | A63H 33/006 446/227 |
| 8,771,033 | B2 * | 7/2014 | Goszewski | A63H 33/006 446/227 |
| 9,295,920 | B2 * | 3/2016 | Aboukrat | A63H 33/006 |
| 2005/0239565 | A1 | 10/2005 | Ransil et al. | |

(Continued)

OTHER PUBLICATIONS

International Search Report and Written Opinion, PCT/US2022/020559, Jun. 21, 2022.

*Primary Examiner* — John A Ricci
(74) *Attorney, Agent, or Firm* — Akerman LLP

(57) ABSTRACT

A hub for a mobile configured to be suspended from a connection line may include a first hub section and a second hub section. The first hub section may include a first fitting and be configured to support at least a first hanger arm. The second hub section may include a second fitting and be configured to support at least a second hanger arm. The first and second fittings may be configured to couple and decouple the first and second hub sections.

21 Claims, 21 Drawing Sheets

(56) References Cited

U.S. PATENT DOCUMENTS

| | | | |
|---|---|---|---|
| 2006/0199468 A1* | 9/2006 | Mastrosimone-Gese | ................... A63H 33/006 446/236 |
| 2015/0321112 A1* | 11/2015 | Aboukrat | ............. A63H 33/006 446/227 |
| 2016/0067622 A1* | 3/2016 | Aderka | ................ A63H 33/006 446/227 |

* cited by examiner

MOBILE HUB

CROSS-REFERENCE TO RELATED APPLICATIONS

This application claims the priority benefit of U.S. Provisional Patent Application No. 63/161,627, filed Mar. 16, 2021, which is incorporated herein by reference in its entirety.

TECHNOLOGY

The present application relates to attachment devices, and more specifically to attachment devices that allow an accessory to be attached to a bassinet or similar sleeping container for a child. An attachment device is described which allows for a mobile, net, or any other item to be hung above a bassinet or sleeping container.

BACKGROUND

During the early part of an infant's life, parents or other caregivers may use a bassinet or crib as a primary sleeping surface for their infant. Bassinets are typically relatively small, portable structures that may have a variety of types of walls or rails surrounding the sleeping surface to prevent the infant from falling out.

In addition to the sleeping portion of a crib or bassinet structure, parents or caregivers may wish to attach accessories to walls, rails, or other surrounding structures. Example accessories can include mobiles, screens, or cameras. Mobiles may be suspended above a crib or bassinet and include various mobile objects that interest or otherwise may hold the gaze of an infant.

SUMMARY

In one aspect, a hub for a mobile configured to be suspended from a connection line includes a first hub section and a second hub section. The first hub section may include a first fitting and be configured to support at least a first hanger arm. The second hub section may include a second fitting and be configured to support at least a second hanger arm. The first and second fittings may be configured to couple and decouple the first and second hub sections.

The hub sections may be configured to be coupled and/or decoupled by interfacing and/or separating fittings of first and second hub sections. In one example, decoupling may include lifting a first hub section from a second hub section to separate the two hub sections. In one configuration, the first hub section may be decoupleable from the first hub section by lifting the second hub section directly from the first hub section to separate the first and second fittings. The hub may be configured to be suspended from a connection line, e.g., as described herein. In a further or another configuration, the hub sections may be coupled by aligning the first fitting over the second fitting and bringing the aligned first and second fittings together along an axis corresponding to the connection line when supporting the hub. In an above or another configuration the first and second hub sections are configured to remain coupled by gravity when the hub is suspended by the connection line. In an above or another configuration, the first and second hub sections each include an orifice through which the connection line extends. When decoupled, the first hub section may be rotated relative to the second hub section about the connection line. In an above or another configuration, the first and second fittings are configured to gravitationally mate to couple the first and second hub sections. In an above or another configuration, the first fitting includes a notch and a raised portion and the second fitting includes a notch complimentary to the raised portion of the first fitting and a raised portion complementary to the notch of the first fitting. The first fitting and second fitting may be configured to couple and decouple by interfacing the respective raised portions and notches of the first and second fittings. In a further configuration, the raised portion of the first fitting is wedge shaped and the notch portion of the second fitting has a wedge shape complementary to the wedge shape of the first fitting. In an above or another configuration, the hub may further include a line anchoring mechanism for anchoring the first and second hub sections relative to a connection line from which the hub section may be suspended. In one example, the line anchoring mechanism may include an orifice through which the connection line extends. The connection line may include a stopper positioned along the connection line. The orifice may include a smaller cross-section dimension than the stopper to prevent the larger cross-section dimension of the stopper from being pulled through the smaller cross-section dimension of the orifice. In a further example, the line anchoring mechanisms includes a housing. The housing, for example, may be removably attachable directly to the second hub section. The housing may include the orifice having the smaller cross-section than the stopper.

In another aspect, a mobile includes a connection line and a hub configured to be suspended from the connection line and comprising a first hub section and a second hub section. The first hub section may include a first fitting and be configured to support at least a first hanger arm. The second hub section may include a second fitting and be configured to support at least a second hanger arm. The first and second fittings may be configured to interface to couple and decouple the first and second hub sections. A first accessory line may extend or be extendable from the first hanger arm and a second accessory line may extend or be extendable from the second hanger arm. One or more mobile objects may be directly or indirectly suspended from the first accessory line. One or more mobile objects may be directly or indirectly suspended from the second accessory line.

The hub sections may be configured to be coupled and/or decoupled by interfacing and/or separating fittings of first and second hub sections. In one example, decoupling may include lifting a first hub section from a second hub section to separate the two hub sections. In one configuration, the first hub section may be decoupleable from the first hub section by lifting the second hub section directly from the first hub section to separate the first and second fittings. The hub may be configured to be suspended from a connection line, e.g., as described herein. In a further or another configuration, the hub sections may be coupled by aligning the first fitting over the second fitting and bringing the aligned first and second fittings together along an axis corresponding to the connection line when supporting the hub. In an above or another configuration the first and second hub sections are configured to remain coupled by gravity when the hub is suspended by the connection line. In an above or another configuration, the first and second hub sections each include an orifice through which the connection line extends. When decoupled, the first hub section may be rotated relative to the second hub section about the connection line. In an above or another configuration, the first and second fittings are configured to gravitationally mate to couple the first and second hub sections. In an above or another configuration, the first fitting includes a notch and a raised portion and the second fitting includes a notch complimentary to the raised portion of the first fitting and a raised portion complementary to the notch of the first fitting. The first fitting and second fitting may be configured to couple and decouple by interfacing the respective raised portions and notches of the first and second fittings. In a further configuration, the raised portion of the first fitting is wedge shaped and the notch portion of the second fitting has a wedge shape complementary to the wedge shape of the first fitting. In an above or another configuration, the hub may further include a line anchoring mechanism for anchoring the first and second hub sections relative to a connection line from which the hub section may be suspended. In one example, the line anchoring mechanism may include an orifice through which the connection line extends. The connection line may include a stopper positioned along the connection line. The orifice may include a smaller cross-section dimension than the stopper to prevent the larger cross-section dimension of the stopper from being pulled through the smaller cross-section dimension of the orifice. In a further example, the line anchoring mechanisms includes a housing. The housing, for example, may be removably attachable directly to the second hub section. The housing may include the orifice having the smaller cross-section than the stopper.

In yet another aspect, a method of coupling and/or decoupling a hub of a mobile may include interfacing and/or separating fittings of first and second hub sections. In one example, decoupling may include lifting a first hub section from a second hub section to separate the two hub sections. In one configuration, the first hub section may be decoupleable from the first hub section by lifting the second hub section directly from the first hub section to separate the first and second fittings. The hub may be configured to be suspended from a connection line, e.g., as described herein. In a further or another configuration, the hub sections may be coupled by aligning the first fitting over the second fitting and bringing the aligned first and second fittings together along an axis corresponding to the connection line when supporting the hub. In an above or another configuration the first and second hub sections are configured to remain coupled by gravity when the hub is suspended by the connection line. In an above or another configuration, the first and second hub sections each include an orifice through which the connection line extends. When decoupled, the first hub section may be rotated relative to the second hub section about the connection line. In an above or another configuration, the first and second fittings are configured to gravitationally mate to couple the first and second hub sections. In an above or another configuration, the first fitting includes a notch and a raised portion and the second fitting includes a notch complimentary to the raised portion of the first fitting and a raised portion complementary to the notch of the first fitting. The first fitting and second fitting may be configured to couple and decouple by interfacing the respective raised portions and notches of the first and second fittings. In a further configuration, the raised portion of the first fitting is wedge shaped and the notch portion of the second fitting has a wedge shape complementary to the wedge shape of the first fitting. In an above or another configuration, the hub may further include a line anchoring mechanism for anchoring the first and second hub sections relative to a connection line from which the hub section may be suspended. In one example, the line anchoring mechanism may include an orifice through which the connection line extends. The connection line may include a stopper positioned along the connection line. The orifice may include a smaller cross-section dimension than the stopper to prevent the larger cross-section dimension of the stopper from being pulled through the smaller cross-section dimension of the orifice. In a further example, the line anchoring mechanisms includes a housing. The housing, for example, may be removably attachable directly to the second hub section. The housing may include the orifice having the smaller cross-section than the stopper.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DETAILED DESCRIPTION

Current accessory attachment devices for rigid rail bassinets are designed in an unsafe manner, e.g., in a way that encourages the attachment device to fall into the bassinet and potentially injure an infant. This safety hazard is magnified if used with bassinets to attach along a flexible rail. For example, the flex in the rail can cause the attachment device to disengage, allowing the attachment device and/or an associated accessory to fall inside the sleep area, potentially injuring the child during the fall and/or creating a suffocation hazard. The attachment device may be configured such that forward disengagement of the device is prevented, whilst allowing simple and controlled disengagement in all other directions. For example, the attachment device may be simply and controllably disengaged by a user in a rearward, vertical, or lateral directions. Various embodiments, the accessory attachment described herein may be configured to avoid such hazards when attached along rigid or flexible rails or other structures.

The present disclosure describes various embodiments of an accessory attachment device. While the accessory attachment device is referred to herein for use with a bassinet, bassinet is intended to include cribs, cradles, bassinets, and other infant and/or young child bed structures and sleeping containers having rails or other structures positioned around the sleep area to which the accessory attachment device may utilize for attachment. One exemplary type of bassinet is the SNOO, manufactured by Happiest Baby, Inc, Los Angeles, CA, which includes breathable walls and flexible upper rails to protect the infant. Parents or caregivers may wish to attach accessories to the surrounding structures, e.g., walls or rails. The accessories may be used to protect or monitor the infant, improve sleep quality, and/or provide auditory or visual stimulation for the infant, for example. In one example, a parent or caregiver may wish to provide a mosquito net to protect the infant while sleeping or to monitor the infant with a camera. In another example, the parent or caregiver may wish to include a mobile above the bassinet to help the infant fall asleep and/or stimulate an infant in the bassinet when the infant is awake. A net, camera or mobile accessory may extend from, or attach to, an attachment point along the accessory attachment device. In one example, an accessory may attach to an adaptor that attaches to the attachment point. Many other accessories may be used with the accessory attachment device, including accessories that require an attachment point over the bassinet.

Figure 1A:
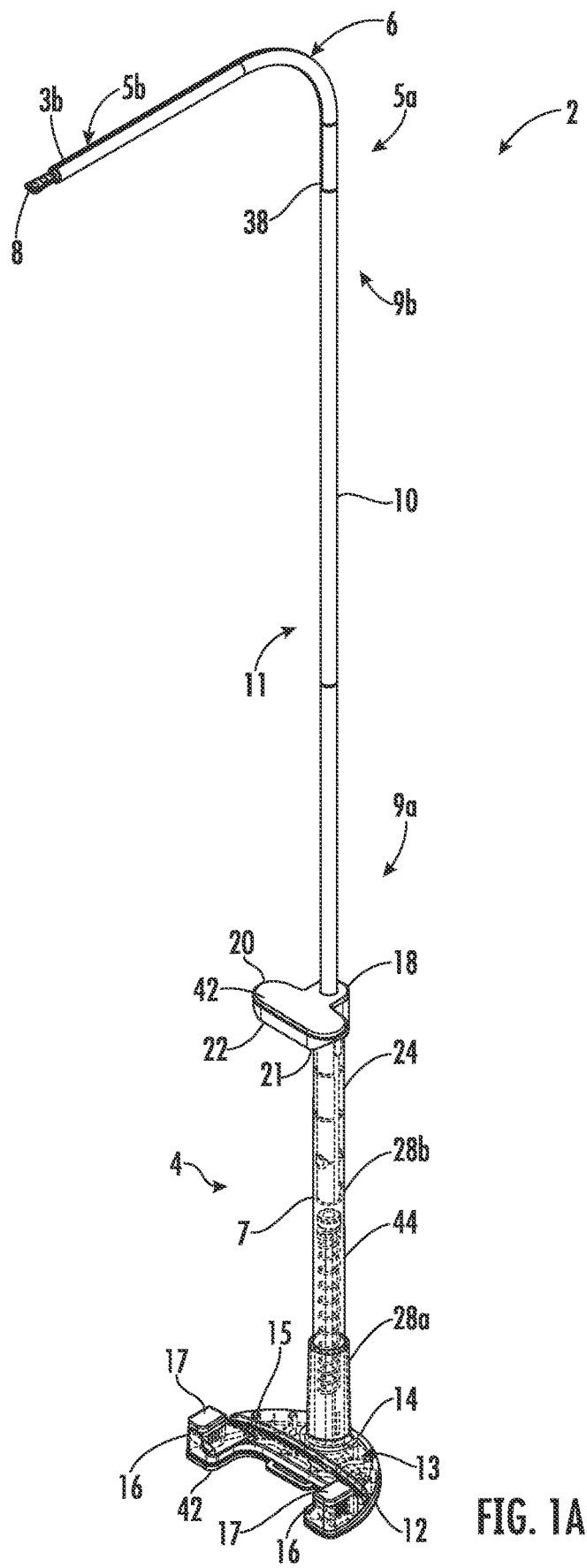
FIG. 1A is a perspective view of an embodiment of an attachment device according to various embodiments described herein.
Figure 1B:
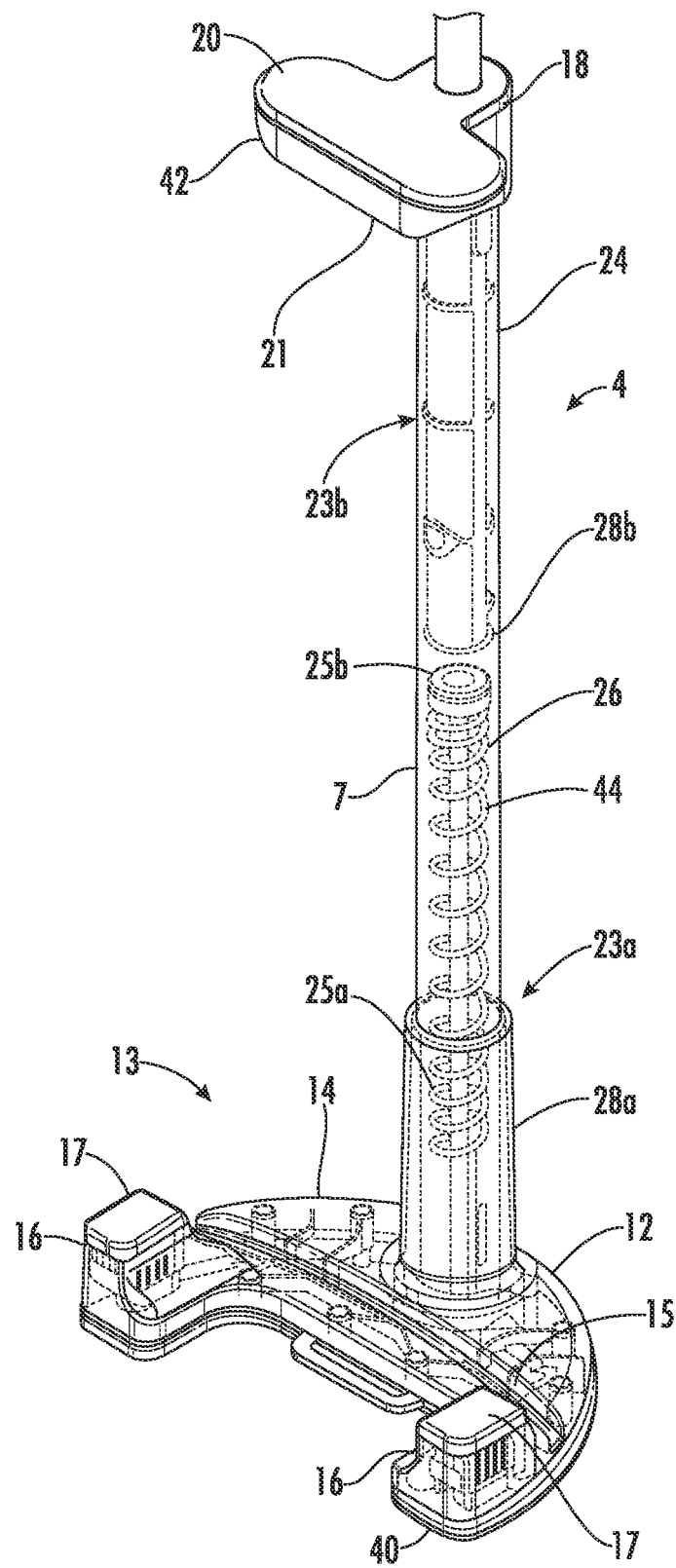
FIG. 1B is a magnified view of the clamp assembly of the attachment device illustrated in FIG. 1A.

FIGS. 1A-18 illustrate various embodiments of an accessory attachment device, mobiles, and related components and uses thereof where like numbers are used to identify like features. With specific reference to FIGS. 1A & 1B, an accessory attachment device 2 may include a clamp assembly 4 and stanchion 10 for attachment with an accessory. The stanchion 10 may include a generally vertically extending portion 11. In some embodiments, the stanchion 10 also includes or couples to an arm portion 6 that extends outwardly from the vertically extending portion 11. Thus, while arm portion 6 may be described herein as a separate structure for ease of understanding, it is to be appreciated that the stanchion 10 may include the arm portion 6 features described herein. Further, the stanchion 10 and/or arm portion 6 may have various lengths, dimensions, profiles (e.g., curve, bend, and/or branch profiles), and/or attachment point designs. A stanchion 10 comprising one or more modular vertical extensions and/or arm portions 6 may allow replacement and/or interchangeability of extensions or arm portions 6 to provide multiple configurations from which an accessory may be positioned. In various embodiments, the accessory attachment device 2 includes a stanchion 10 and two or more arm portions 6 having different configurations. In one example, each configuration may be interchangeably used with two or more accessories. In a further or another example, each configuration may be unique for a particular accessory. In an example, multiple arm portions may be used together to increase a length, provide a different profile, etc. to suit a desired use.

The stanchion 10, or the vertically extending portion 11 thereof, may include a first end 9a that extends from the clamp assembly 4 and a second end 9b that extends to the arm portion 6. The second end 9b of the stanchion 10 interfaces with a first end 5a of the arm portion 6. The arm portion 6 may extend from the first end 5a to a second end 5b. An attachment point 8 may be positioned along the second end 5b and may be configured to receive an accessory, for example netting, a camera, or a mobile. In some embodiments, the stanchion 10 and/or arm portion 6 may be constructed from sturdy and/or lightweight materials. For example, the stanchion 10 and/or arm portion 6 may comprise a lightweight metal, such as aluminum, a composite material, or any other durable, lightweight material. The arm portion 6 may be modular with respect to the stanchion 10 or may be integral therewith. In one embodiment, the attachment device 2 does not include an arm portion 6, but rather the attachment point 8 for attaching to an accessory is positioned along the second end 9b. In a further embodiment, the attachment device 2 includes an integrated accessory that extends from the stanchion 10 or arm portion 6. In the illustrated embodiment, the stanchion 10 and arm portion 6 include a series of threaded sleeve sections that may be removed, replaced, or interchanged to modify a length and/or structure of the stanchion 10 and/or arm portion 6. However, in some embodiments, the stanchion and/or arm portion 6 may include additional, fewer, or only a single section. In various embodiments, the arm portion 6 may be curved so that the first end 5a may attach to the vertically extending portion 11 of the stanchion 10 while the second end 5b may be in a generally or substantially horizontal orientation, which may be configured to extend at least partially above a bassinet 50. The curve of arm portion 6 may also provide a convenient grasping point to quickly remove attachment device 2 if necessary. The attachment point 8 may be preferably located on the distal portion of the second end 5b of arm portion 6. The arm portion 6 may be preferably attached to the stanchion 10 at a proximal portion

38 of the first end 5a of arm portion 6. The stanchion 10 is preferably constructed from a rigid material such as metal or a composite. In some embodiments, the stanchion 10 may comprise a tube having a round, triangular, rectangular, square, or other geometric or non-geometric cross-section. In a further or another example, the stanchion 10 may comprise a solid or hollow interior bore. In a further example, the stanchion 10 may be hollow to provide space for wiring or additional mechanisms.

Clamp assembly 4 may include a lower clamp 12, upper clamp 18, and a connector 7 connecting the lower clamp 12 and upper clamp. The connector 7 may include a housing 24. The clamp assembly 4 is configured to bias the lower and upper clamps 12, 18 toward each other to clamp to lower and upper structures of a bassinet.

The lower clamp 12 may include a lower clamp body 14 and one or more lower clamp feet 16. The lower clamp body 14 is preferably constructed of a sturdy material, including metals, composites, and polymers. The lower clamp 12 may be attached to a lower end of the connector 7. In the illustrated embodiment, the lower clamp 12 is connected to the connector 7 along a lower portion of housing 24. The lower clamp body 14 may extend outwardly from the lower portion of housing 24 to position the lower clamp feet 16 outwardly of the connector 7 and housing 24 thereof. The lower clamp feet 16 may extend from a distal portion 40 of the lower clamp body 14. The lower clamp feet 16 may further extend upwardly from the lower clamp body 14 and be configured to engage a bassinet in use. The lower clamp feet 16 may include engagement surfaces 17 for engaging a bassinet. The lower clamp feet 16 and/or engagement surfaces 17 preferably comprise a compressible and/or elastomeric material such as silicone. In various embodiments, engagement surfaces 17 may be contoured to correspond with contours of an intended attachment point on a bassinet to which it is to attach. For example, the lower clamp feet 16 may include an arcuate contour to correspond with that of an arcuate contour of a lower rail, underside, or other lower bassinet structure. In one embodiment, the lower clamp feet 16 comprise a groove to engage a lower edge of a bassinet. In the illustrated embodiment, the lower clamp feet 16 include planar engagement surfaces 17 constructed from silicone. While two lower clamp feet 16 are illustrated, in some embodiments, additional lower clamp feet 16 may be included. In one embodiment, only a single lower clamp foot 16 extends from the lower clamp body 14.

The connector 7 and lower clamp feet 16 may be spaced apart to provide a horizontally extending gap 13 therebetween. For example, the lower clamp body 14 may extend outwardly or distally from the connector 7 or housing 24 and the lower clamp feet 16 may extend upward from an outward or distal portion 40 of the body 14. In use, the gap 13 may provide a location for a lower edge or structure, such as a lower rail, of a bassinet to position. In one example, the gap 13 is defined between the housing 24 and the lower clamp feet 16. In some embodiments, and as exemplified in the illustrated embodiment, the lower clamp body 14 further defines a groove 15 along its upper surface that further defines a base of the gap 17. The groove 15 comprises a width and depth suitable to receive a lower edge or structure of a bassinet when the accessory attachment 2 attaches to a bassinet. In the illustrated embodiment, the groove 15 extends along a slight arcuate path to correspond with a curvature of a lower edge or structure of a bassinet. In some embodiments, a groove 15 may extend along a straight path or path having other curvatures. In various embodiments, the groove 15 is dimensioned such that a lower edge or structure of the bassinet does not contact or substantially contact the upper surface of the lower clamp body 14 defining the groove 15 when received within the groove 15. In one example, the groove 15 is dimensioned to closely approximate the dimensions of a lower edge or structure of a bassinet such that interaction therebetween when received therein limits significant movement of the lower clamp 12 and the stanchion 10 and arm portion 6 from falling toward the sleep area of the bassinet. Typically, the engagement surfaces 17 are positioned to engage a lower or underside of a bassinet; however, in some embodiments, the upper surface of the lower clamp body 14 that forms a base of gap 13 may be configured to engage a lower edge or rail in addition to or instead of engagement surfaces 17. In one such embodiment, the upper surface of the lower clamp body 14 forming the base of gap 13 includes a compressible or elastomeric material configured to engage a lower edge or rail of a bassinet. In an example including a groove 15, the lower clamp body 14 may be configured to engage a lower edge or rail of a bassinet within the groove 15. In some embodiments, the lower clamp 12 does not include a gap 13 and/or groove 15.

The upper clamp 18 may include an upper clamp body 20 and upper clamp feet 22. The upper clamp 18 may be attached to an upper portion of the connector 7. In the illustrated embodiment, the upper clamp 18 is attached to the connector 7 along an upper portion of housing 24. The upper clamp 18 may be preferably constructed from a sturdy material, including metals, composites, and polymers. The upper clamp body 20 may include one or more upper clamp feet 22 which extend downwardly from the upper clamp body 20 to engage an upper structure of a bassinet, such as an upper rail 52. Preferably, the upper clamp body 20 comprises a compressible and/or elastomeric material such as silicone. An upper clamp foot 22 may extend from a distal portion 42 of the upper clamp body 20 and be configured to compress against an upper structure of a bassinet, such as an upper rail, when biased there against by the operation of the clamp assembly 4. Such compression shall be sufficient to hold the clamp assembly 4 under normal use but release if more than normal force is applied (such as a toddler or pet pulling on the attachment device 2 or attachment coupled thereto). This feature may be implemented to prevent the attachment device 2 from providing a location from which the position of a bassinet may be manipulated. That is, the clamp assembly 4 may be configured to disengage upon application of force sufficient to pull over the bassinet or sleep surface. The attachment device 2 may also be configured to fall away from the sleep surface when disengaged. The upper clamp foot 22 may include one or more engagement surfaces 21 for engaging a bassinet. The upper clamp foot 22 and/or engagement surfaces 21 may preferably comprise a compressible and/or elastomeric material such as silicone. Engagement surfaces 21 may be planar or contoured to correspond with contours of an intended attachment point on a bassinet to which it is to attach. For example, the upper clamp foot 22 may have an arcuate contour to match that of an upper rail or edge of a bassinet. In one embodiment, the upper clamp foot 22 comprises a groove to engage an upper edge of a bassinet. In the illustrated embodiment, the upper clamp foot 22 includes an arcuate engagement surface 21. In some embodiments, a distal portion 21a of the engagement surface 21 may extend along a reduced radius relative to a proximal portion 21b of the engagement surface 21. In this or another embodiment, the proximal portion 21a of the engagement surface 21 may extend vertically below the distal portion 21b of the engagement surface 21. While the illustrated upper clamp 18 includes a single upper clamp foot 22, in some embodiments the upper clamp 18 includes additional upper clamp feet 22. In the illustrated embodiment, the upper clamp feet 22 are also offset distally with respect to the lower clamp feet 16 such that the upper clamp feet 22 do not extend as far distally as the lower clamp feet 16. This arrangement may encourage the entire attachment device 2 to fall outside of the bassinet 50 in the event the attachment device 2 is accidentally detached, for example, during bassinet use. For example, when a lower edge or rail of a bassinet is positioned within the gap 13, the stanchion 10 and arm portion 6 are prevented from falling forward into a sleeping area of the bassinet 50.

The connector 7 may comprise a generally vertically extending expanse of material that connects the lower and upper clamps 12, 18. As introduced above, the connector 7 may include a housing 24 that houses a bias member 26 that biases the lower and upper clamps 12 toward each other. The housing 24 may include a hollow portion in which the bias member 26 is positioned or the bias member 26 may be positioned along an exterior side of the housing 24. The housing may include a first end 23a and a second end 23b. The first end 23a may extend to the lower clamp 12 and the second end 23b may extend to the upper clamp 18. The bias member 26 may bias the first and second ends 23a, 23b toward each other. For example, the first end 23a may be movable relative to the second end 23b and the bias member 26 may include a first end 25a that connects to the first end 23a of the housing 24 and a second end 25b that connects to the second end 23b of the housing 24. The housing 24 may preferably include a rigid and/or flexible material. For example, the first and second ends 23a, 23b and a flexible or stretchable material may be coupled therebetween to allow the first and second ends 23a, 23b to relatively move. In another example, the first and/or second ends 23a, 23b include a sleeve within which the other may slide to maintain alignment between the ends 23a, 23b during relative movement. In the illustrated embodiment, the housing 24 has a cylindrical shape with a lumen passing through the cylinder in the vertical direction. Alternatively, the housing 24 may comprise a pipe having any cross-sectional shape that includes a lumen. As introduced above, the housing 24 houses a biasing member 26, which in the illustrated embodiment comprises a spring. Other bias members may be used, such as elastic bands and/or other biasing structures and configurations. The housing 24 further includes fixing points 28a, 28b within the lumen. Fixing points 28a, 28b may be located along first and second ends 28a, 28b of housing 24 to thereby fix ends 25a, 25b of the bias member 26 relative to the ends 23a, 23b of the housing 24. Alternatively, fixing points 28a, 28b may be located on a rod 44 that passes through the lumen of housing 24. The bias member 26 may be selected such that it continually imparts a force that tends to pull the upper clamp 18 and lower clamp 12 toward one another, at least to a distance that is less than that of attachment points the clamp is configured to attach. This allows upper clamp 18 to continually exert a downward force on an upper structure, such as a upper rail, of a bassinet and lower clamp 12 to continually exert an upward force on a lower or underside structure of the bassinet such that the clamping force securely fixes the attachment device 2 to the bassinet. The force may also be configured to allow the attachment device 2 to be easily removed from the bassinet by countering the force to expand the clamp assemble 4.

Figure 2A:
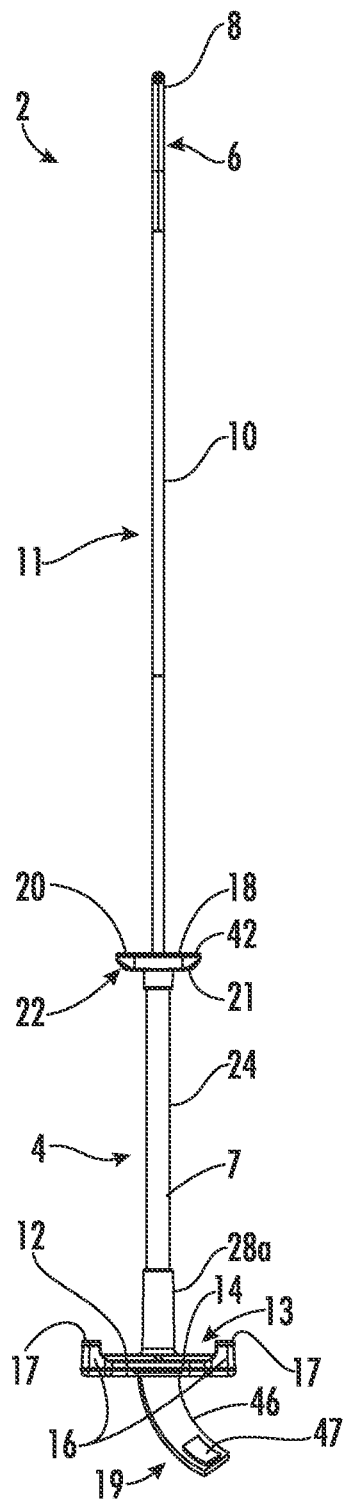
FIG. 2A is a front elevation view of an attachment device according to various embodiments described herein.
Figure 2B:
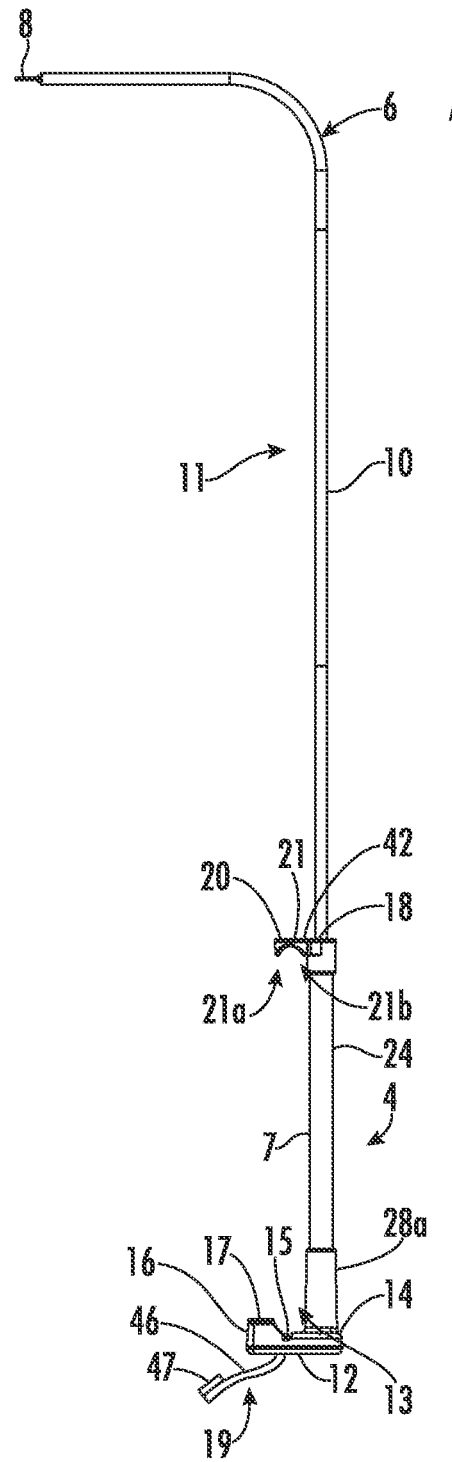
FIG. 2B is a side elevation view of the attachment device illustrated in FIG. 2A according to various embodiments described herein.

FIGS. 2A & 2B illustrate a further embodiment of the accessory attachment device 2 including a secondary attachment 19 for providing a secondary attachment to a bassinet. The accessory attachment device 2 may be otherwise as described above with respect to FIGS. 1A & 1B. In the illustrated embodiment, the secondary attachment device 19 includes a strap 46 that extends from the lower clamp 12. The strap 46 includes an attachment structure 47 comprising a hook or loop material configured to couple with a complementary hook or loop material positioned on a bassinet. The complementary hook or loop material may be located along an underside of the bassinet, for example, or elsewhere. In some embodiments, the strap 46 may additionally or alternatively include other attachment structures 47 such as snaps, clips, zippers, rail and groove, or magnets, for example, for coupling the strap to a corresponding attachment structure positioned on the bassinet. It will be appreciated that other secondary attachments 19 may be used. For example, the lower clamp 12, such as lower clamp body 14, lower clamp feet 16, base of the gap 13, and/or engagement surfaces 17 may include magnets, magnetized material, or magnetic attracted material configured to engage or proximate magnets, magnetized material, or magnetic material positioned on a bassinet to provide additional security. In one example, the accessory attachment device 2 includes a clip configured to clip to a bassinet.

Figure 3:
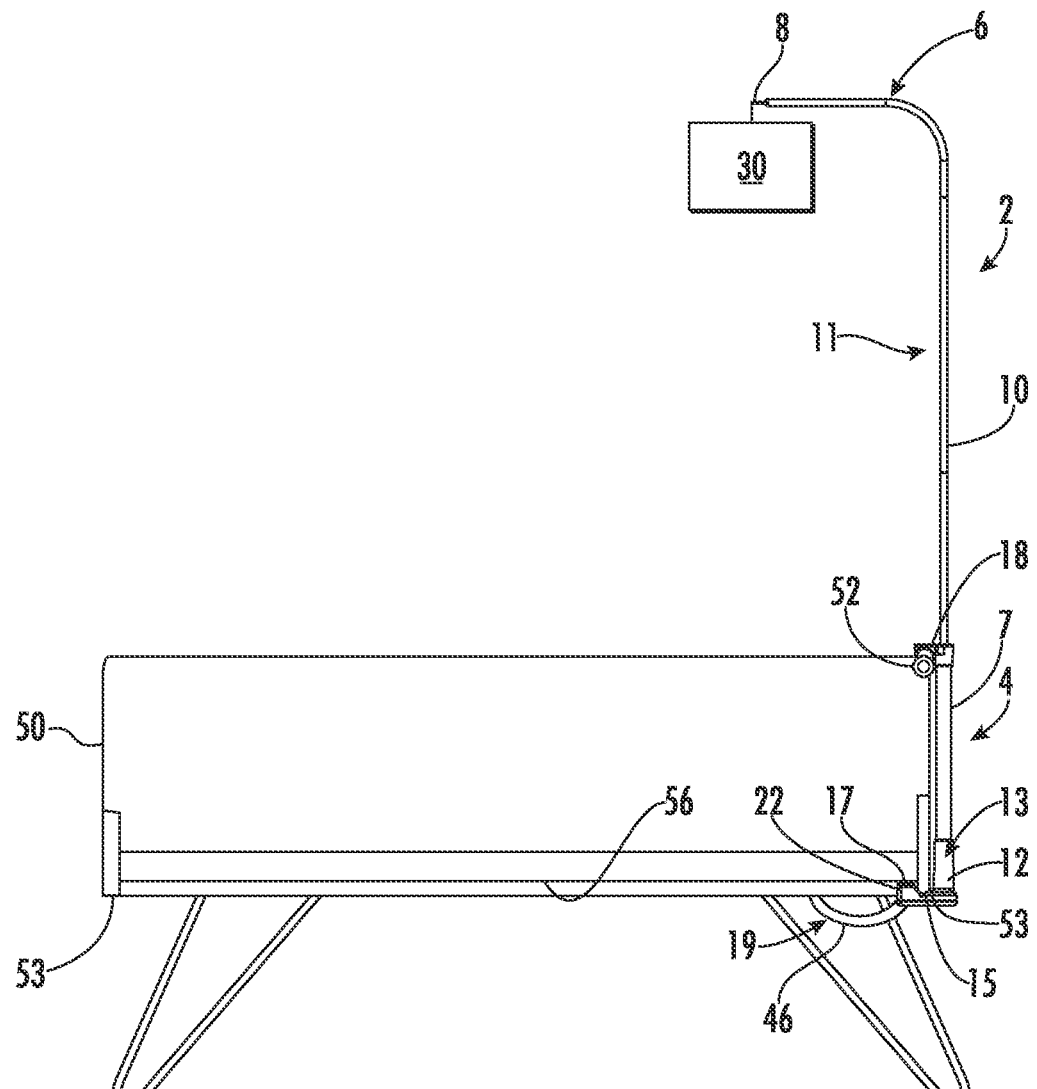
FIG. 3 is a side elevation view in cross-section of an attachment device installed on a bassinet according to various embodiments described herein.

FIG. 3 depicts the accessory attachment device 2 illustrated in FIGS. 2A & 2B attached to a bassinet 50. To install the attachment device 2, a user may hook the lower clamp 12 to the underside of the bassinet 50 or sleeping surface thereof and then extend the upper clamp 18 above an upper portion of the bassinet 50, such as the upper rail surface. The upper clamp 18 may then be released. The attachment assembly 4 will self-adjust to the position of the height and position of the bassinet 50 attachment points. For example, the user may need only hook the lower clamp 12 and pull the upper clamp 18 above the rail of the bassinet 50 and the clamp assembly 4 may then snap into place. In a further example, a user may position lower feet 16 around the lower edge 53 of the bassinet to hook and/or engage an underside 56 of the bassinet 50. With some bassinet 50 configurations the lower edge 53 may position in gap 13 and further extend into groove 15. The user may then position the attachment device 2 such that the upper clamp 18 is above the upper rail 52. The user may then release the upper clamp 18 to allow the engagement surface 21 to engage the upper rail 52 such that the attachment device grasps the upper rail 52 and the underside 56 of the bassinet 50 between the upper clamp 18 and lower clamp 12. The secondary attachment 19 may also be attached by extending the strap 46 along the underside 56 of the bassinet 50 to interface the hook or loop attachment structure 47 with the corresponding hook or loop material positioned along the underside 56 of the bassinet 50. Before, during, or after installing the accessory attachment 2, the user may attach an accessory 30 to the attachment point 8 on the arm portion 6. In various embodiments, adaptors that allow different accessories 30 to be attached to the attachment point 8, including but not limited to nets, mobiles, or cameras may be used. In some instances the attachment point 8 or adaptors coupled to the attachment point 8 may comprise universal attachment structures configured to interchangeably attach two or more accessories 30. It will be understood that any other, preferably lightweight, accessory may also be hung over bassinet 50 using attachment point 8. As noted above, in some embodiments, an accessory may be integrated with stanchion 10 and/or arm portion 6.

Figure 4A:
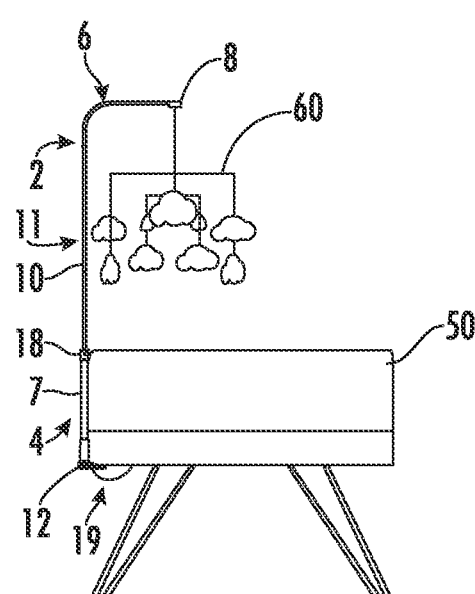
FIG. 4A is a side elevation view of an attachment device and an accessory mobile installed on a bassinet according to various embodiments described herein.
Figure 4B:
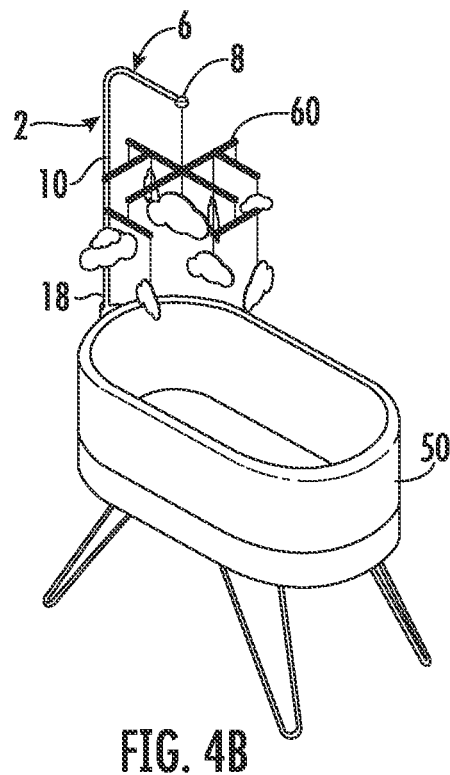
FIG. 4B is a perspective view of the attachment device and accessory mobile installed on the bassinet illustrated in FIG. 4A according to various embodiments described herein.
Figure 4C:
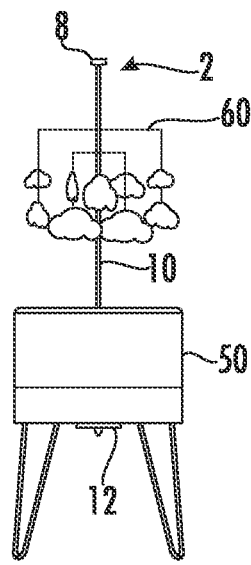
FIG. 4C is a front elevation view of the attachment device and accessory mobile installed on the bassinet illustrated in FIGS. 4A & 4B according to various embodiments described herein.

FIGS. 4A-4C illustrate an example of FIG. 3 wherein the accessory 30 comprises a mobile 60 attached to the accessory attachment 2. The mobile 60 may be attached or attachable to the attachment point 8 by any suitable method.

For example, the mobile 60 may be attached via clamp, bracket, clips, or via mateable structures such as a press-fit, rail and groove, or threaded connections. In one example, the attachment point 8 or adapter attached to the attachment point may include a slot having an open end. A string extending from the mobile 60 may be knotted and inserted into the slot through the open end such that the knot positions on a first side of the slot and a mobile end of the string positions on a second side wherein the dimensions of the slot prevent the knot from being pulled through the slot. In a further embodiment, a cap may be placed over the attachment point 8 to prevent the string from being pulled from the open end of the slot.

Figure 5:
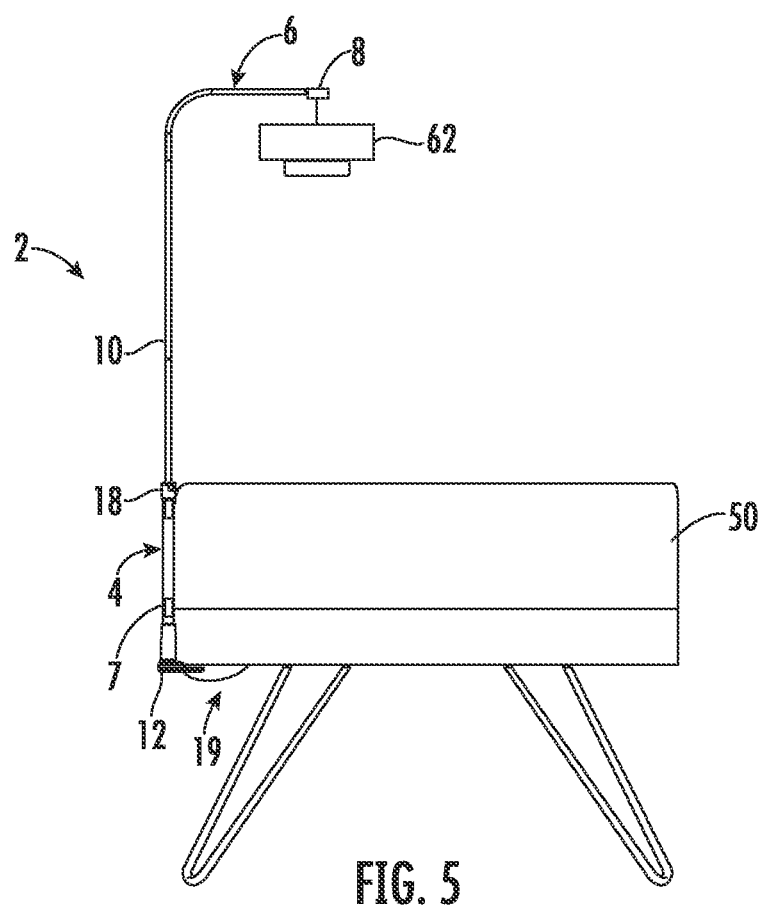
FIG. 5 is a side elevation view of an attachment device and an accessory camera installed on a bassinet according to various embodiments described herein.

FIG. 5 illustrates another example of FIG. 3 wherein the accessory 30 comprises a camera 62 attached to the accessory attachment 2. The camera 62 may be directed at the child or elsewhere. The camera 62 may be attached to the attachment point 8 by any suitable method. For example, the camera 62 may be attached via clamp, bracket, clips, or via mateable structures such as a press-fit, rail and groove, or threaded connections. The camera 62 may be wireless and/or wiring for the camera 62 may run through a lumen of stanchion 10 and/or arm portion 6 or be wrapped around the same.

Figure 6A:
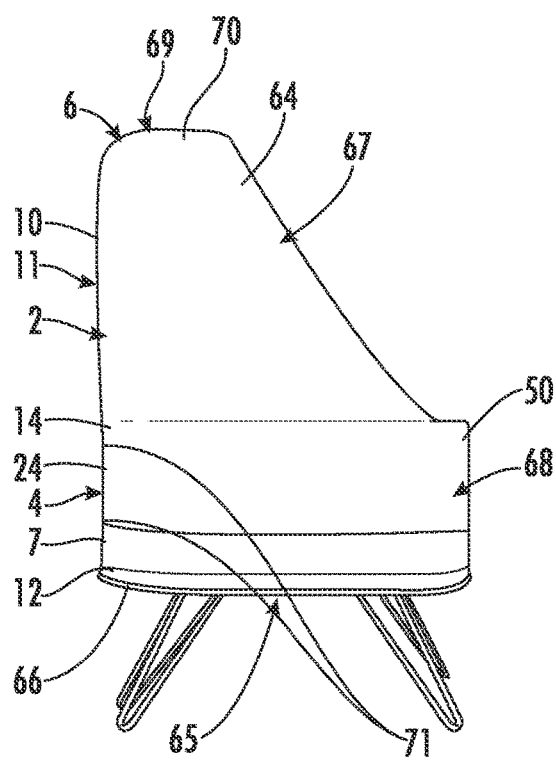
FIG. 6A is a side elevation view of an attachment device and accessory mosquito net installed on a bassinet according to various embodiments described herein.
Figure 6B:
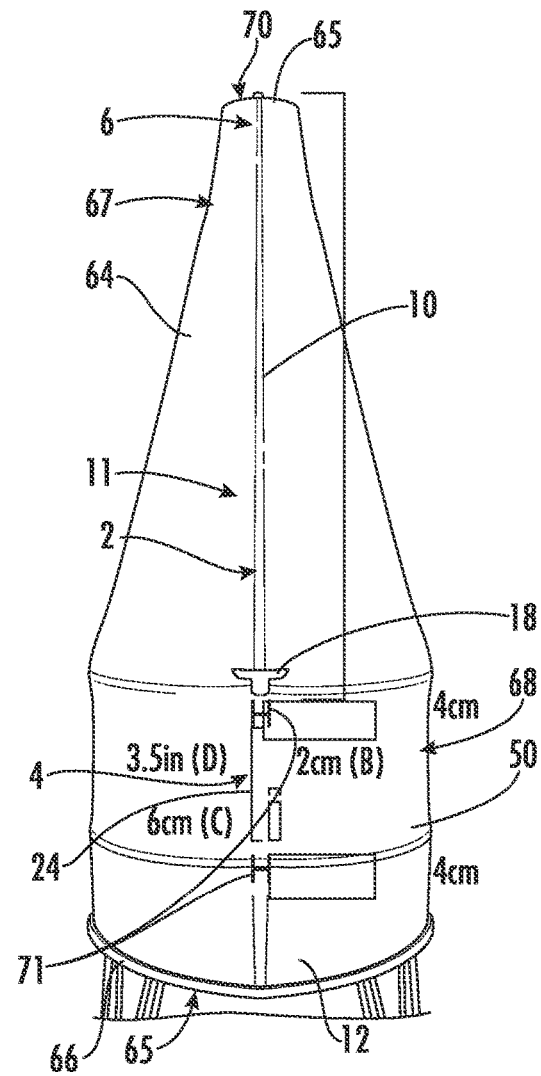
FIG. 6B is a rear elevation view of the attachment device and accessory mosquito net installed on the bassinet illustrated in FIG. 6A according to various embodiments described herein.

FIGS. 6A & 6B illustrate another example of FIG. 3 wherein the accessory 30 comprises a mosquito net 64 attached to or positioned on the accessory attachment 2 stanchion 10 and/or arm portion 6. For example, a user may attach a mosquito net 64 or component thereof to the attachment point and then drape the mosquito net 64 around the bassinet 50. The mosquito net 64 preferably fits snuggly around an exterior of the bassinet 50 and includes a weighted hem or edge 66 to help keep the mosquito net 64 in place and taut. In one example, a cord of a weight material may be lined within the hem of edge 66. In another example, sand, glass beads or other weighting material may be held within the hem of edge 66. In some embodiments, an interior perimeter of the mosquito net 64 increases toward the opening 65 along a first portion 67 and then maintains a substantially consistent perimeter along a second portion 68 corresponding to the portion of the net 64 that positioned around the sides of the bassinet 50. In a further embodiment, the perimeter of the first portion 67 when expanded defines a conical cross-section that increases along the first portion 67 toward the second portion 68. In a further or another embodiment, one side of the mosquito net 64 may extend substantially vertically from the opening 65 to a bottom 69 of the net 64 along a first side, corresponding to a side the interfaces with the accessory attachment 2, and extends from the base 69 along a second side, opposite the first side, along the first portion 67 to the second portion 68 at an angle less than 90 degrees, such as less than about 80 degrees, less than about 70 degrees, less than about 60 degrees, or less than about 50 degrees from the second side. In a further example, the second side may extend along the second portion 68 about parallel to the first side. One or more clips 71 may also be used to clip the mosquito net 64 to the stanchion 10, arm portion 6, and/or clamp assembly 4.

In the illustrated embodiment, the mosquito net 64 is draped over a positioning structure 70 configured to allow the mosquito net 64 to maintain interior volume above the bassinet 50 in use. The positioning structure 70 may comprise an expanse of material that maintains separation of sides of the mosquito net 64 when positioned therein. The expanse of material is preferably positioned along the bottom 69 when in use, but other locations within the mosquito net 64 may be used. In some embodiments, the mosquito net 64 may be attached to the attachment point or an adaptor attached along the attachment point. In various embodiments, the positioning structure 70 may extend about parallel to the hem or edge 66 of the net 64, upper rail, and/or lower edge of the bassinet. In other embodiments, the positioning structure 70 may extend at non-parallel angles to that of the hem, upper rail, and/or lower edge of the bassinet to compensate for the weight of the net 64 asserting a downward pull on 70.

Figure 7:
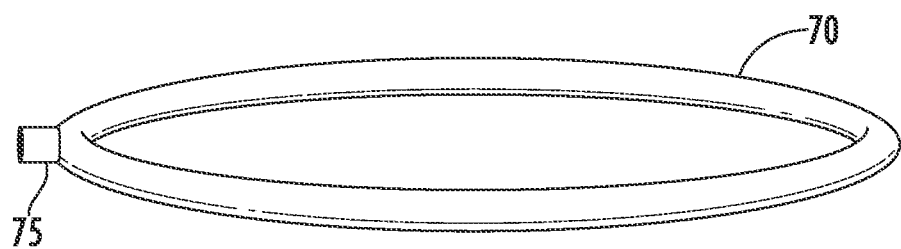
FIG. 7 illustrates a halo attachment for according to various embodiments described herein.

FIG. 7 illustrates an example positioning structure 70 comprising an expanse of material configured to separate sides of a mosquito net, e.g., as described with respect to FIGS. 6A & 6B. The shape of the positioning structure 70 provides a form to the net 64 and separates an interior expanse of the net 64 to provide space between sides of the net 64 that drape from the periphery of the positioning structure 70. In some embodiments, the positioning structure 70 may include an opening between periphery portions to allow light passage and provide a central open portion along the bottom of the net 64, which forms an upper extent of the net 64 when positioned over the positioning structure 70 The illustrated positioning structure 70 comprises an oblong ring or halo shape having an attachment structure 75 for attaching to the attachment point of the accessory attachment. In some embodiments, the positioning structure 70 may comprise other shapes such as circular, triangular, quadrilateral, or other geometric or non-geometric shape. The positioning structure 70 may or may not include a central opening. In one example, the positioning structure 70 comprises one or more rods, which may radiate outwardly from one or more points to expand the interior of the net 70 and provide.

The attachment structure 75 may comprise any suitable attachment structure. For example, the attachment structure 75 may comprise a slot to receive the attachment point or an adaptor, for example. In some embodiments, the attachment structure 75 comprises a threaded connection. In the illustrated embodiment, the attachment structure 75 is positioned along a lateral side of the positioning structure to extend approximately level with the top of the arm when attached. In other embodiments, the attachment structure 75 may be positioned to interface with the attachment point or an adaptor coupled there along such that attachment results in the positioning structure 70 extending above, below, and/or to one or more sides of the arm portion. Although the accessory attachment device has been described as engaging a lower rail, underside, and/or lower edge of a bassinet, it will be understood that the accessory attachment device may be secured by placing the lower clamp feet and/or engagement surfaces in contact with the underside of any stable structure located below the upper structure or upper rail of the bassinet. As noted above, in some embodiments, the lower clamp may be engaged with a lower rail or lower edge of a bassinet, which may be in addition to or instead of engaging an underside of the bassinet. In one such example, the upper and lower engagement surfaces are not horizontally offset. In a further or another example, gap is absent.

Figure 8A:
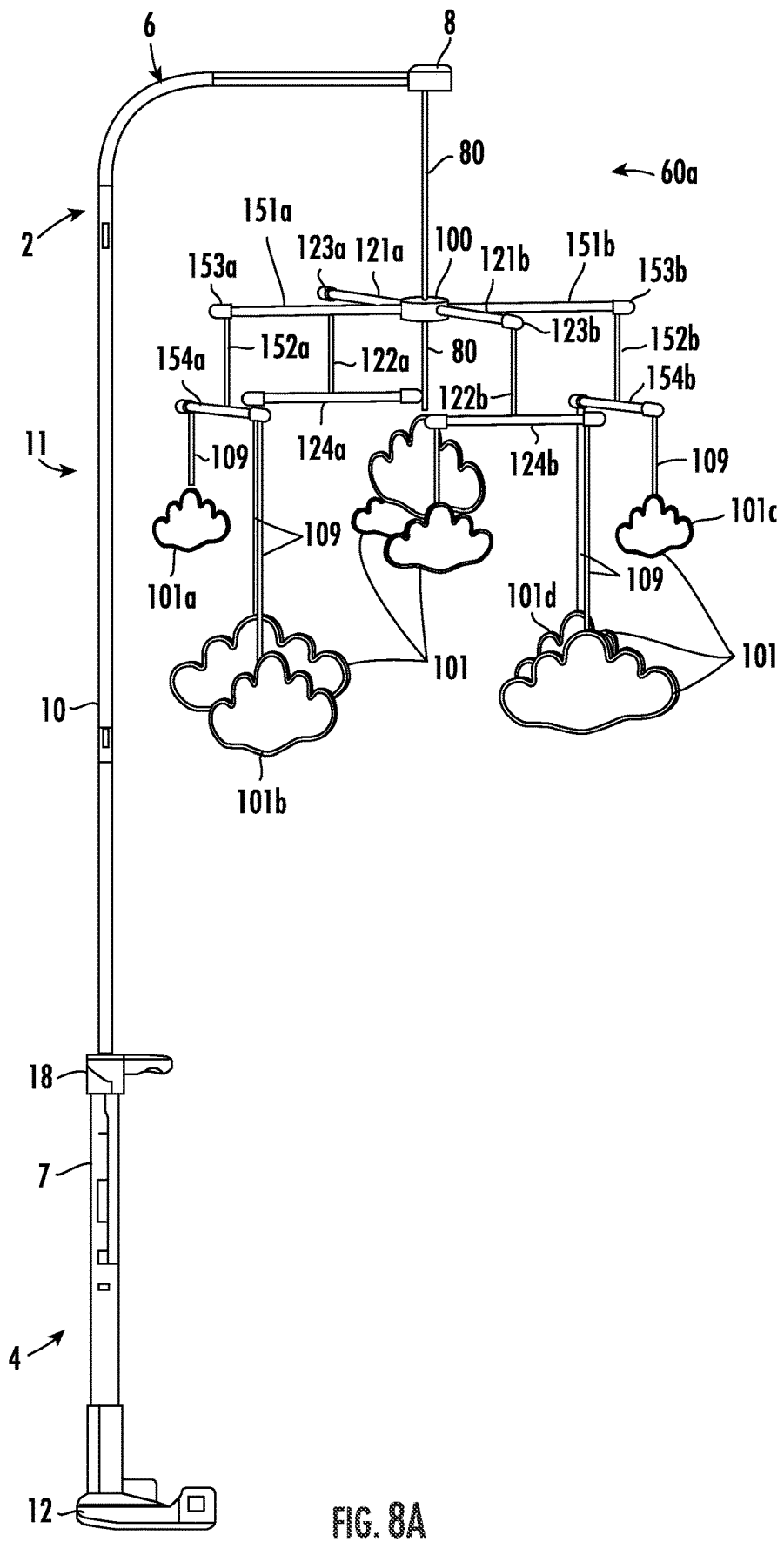
FIGS. 8A & 8B illustrate perspective views of a mobile supported by an accessory attachment device according to various embodiments described herein.
Figure 8B:
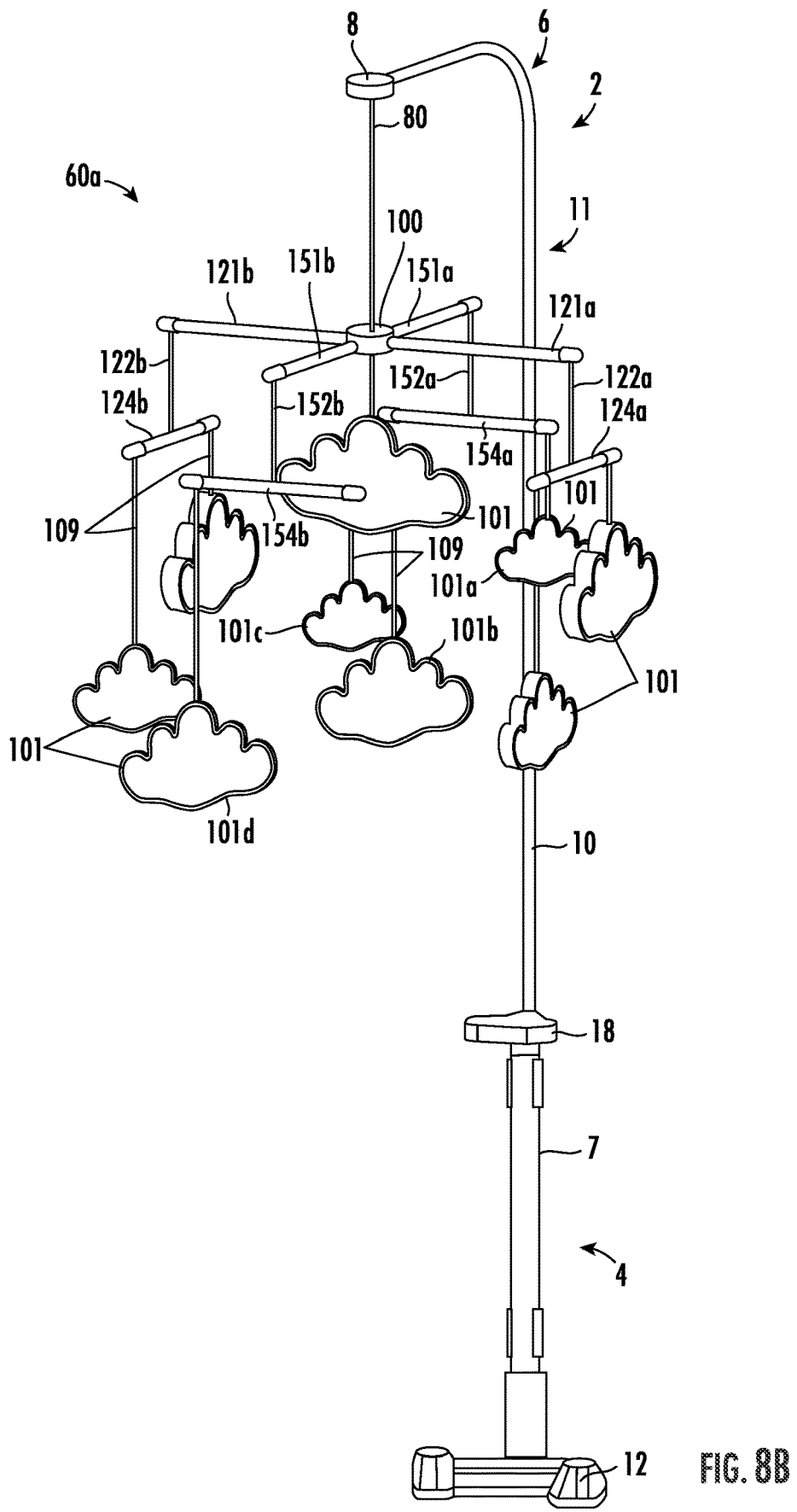

FIGS. 8A & 8B illustrate perspective views an embodiment of a mobile 60a attached to an example accessory attachment device 2 as described herein. The mobile 60a may be attached to the arm portion 6 to hang over a bedding area. The mobile 60a may include a connection line 80 for attachment to the arm portion 6 at the attachment point 8. The mobile 60a may attach to the attachment point 8 in any suitable manner, such as described with respect to FIGS. 4A-4C. In one embodiment, the mobile 60a includes a clip, connector, or other attachment structure configured to attach to the arm portion 6 or attachment point 8 therealong.

While the mobile 60a is shown attached to the accessory attachment device 2, the mobile 60a may be hung by or from any suitable structure for hanging the mobile 60a.

As introduced above, the mobile 60a may include a connection line 80 that extends to a hub 100 to support the mobile 60a. The mobile 60a may include or more hanger arms 121a, 121b, 151a, 151b configured to attach to accessory lines 122a, 122b, 152a, 152b that hang from the hanger arms 121a, 121b, 151a, 151b to directly or indirectly support mobile objects 101, shown as clouds in the illustrated embodiment. Mobile objects 101 that may be suspended from a connection line 80 are known in the art and any mobile object 101 suitable for suspension on the mobile 60a may be used. For example, plush, colorful, reflective, or other object that may be of interest to an infant or other user may be used. In some embodiments, the mobile objects 101 may incorporate movable or actuatable extensions, displays, speakers, cameras, or other electronics to increase interest and/or observe the infant or other user. As shown, the hanger arms 121a, 121b, 151a, 151b indirectly support the mobile objects 101 and accessory attachment lines 122a, 122b, 152a, 152b extended from outer ends 123a, 123b, 153a, 153b of the hanger arms 121a, 121b, 151a, 151b to secondary hanger arms 124a, 124b, 154a, 154b and secondary accessory attachment lines 109 extend from ends of the secondary hanger arms 124a, 124b, 154a, 154b to attach to the mobile objects 101. However, any combination of hanger arms and accessory attachment lines may be used to design various arrangements of hanging mobile objects 101.

The accessory attachment lines and mobile objects will typically be arranged to extend from hanger arms such that when assembled the mobile is balanced. For example, in the illustrated embodiment, the mobile objects 101 have different sizes. The mobile objects 101 supported on each secondary hanger arm 124a, 124b, 154a, 154b are balanced by weight to maintain the secondary hanger arm 124a, 124b, 154a, 154b at a desired angle when the mobile 60a is suspended, which is parallel to the ground in the illustrated embodiment. For example, secondary hanger arm 124a includes a first mobile object 101a and a second mobile object 101b that is larger than the first mobile object 101a. The first mobile object 101a is weighted to correspond to the weight of the second mobile object 101b to maintain balance along the secondary hanger arm 124a relative to the connection point to accessory line 152a. Third and fourth mobile objects 101c, 101d supported from secondary hanger arm 154b are similarly weighted to balance the secondary hanger arm 154b relative to the connection point to accessory line 152b. Secondary accessory arm 154a and secondary accessory arm 154b are weighted to balance hanger arm 151a, 152b relative to connection line 80. Hanger arm 121a, 121b and secondary hanger arms 122a and 122b are similarly balanced by the mobile objects 101 they support. It will be appreciated that balancing may also include modification of the position to which the connection line 80 and accessory attachment lines 122a, 122b, 152a, 152b, 109 attach to hanger arms 221a, 121b, 151a, 151b and/or secondary hanger arms 124a, 124b, 154a, 154b.

In some embodiments, the connection line 80 may extend beyond the hub 100 to connect to one or more additional hangers to similarly support one or more mobile objects. In the illustrated embodiment, the connection line 80 extends beyond the hub 100 to connect to a mobile object 101. In other embodiments, the connection line 80a may terminate at the hub 100.

Figure 9:
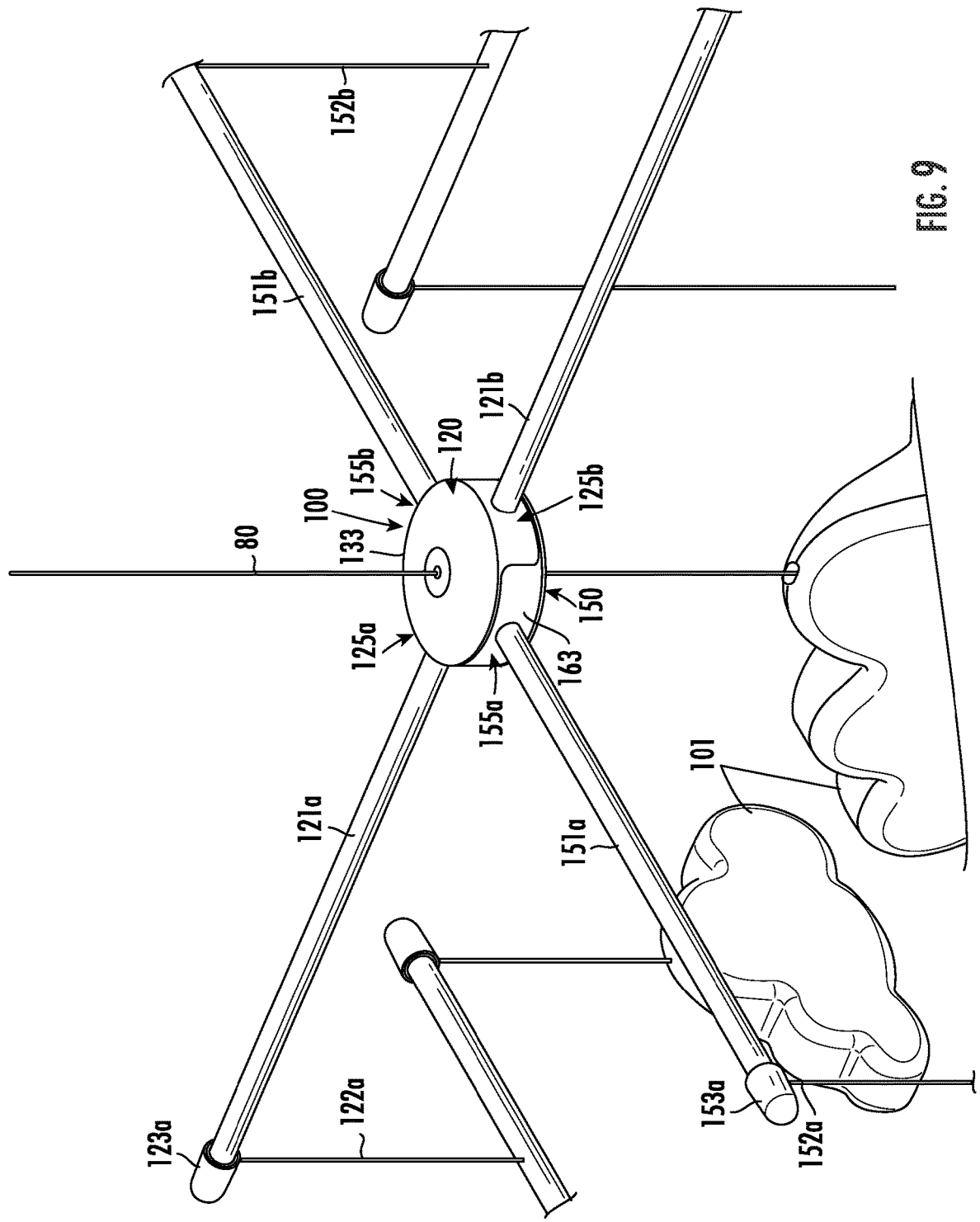
FIG. 9 is an overhead view of an upper portion of a mobile including a hub according to various embodiments described herein.

With further reference to FIG. 9, the hub 100 may comprise two or more couplable hub sections 120, 150 configured to be uncoupled, typically for storage, transport, or replacement or modification of hanger arms, and coupled for use. Each hub section 120, 150 will typically attach to one or more hanger arms 121a, 121b, 151a, 151b. In the illustrated embodiment, the hub 100 includes a first hub section 120 and a second hub section 150, each connected to two hanger arms 121a, 121b, 151a, 151b that extend laterally from sides 125a, 125b, 155a, 155b of the hub sections 120, 150.

As noted above, in some embodiments, additional or fewer hanger arms 121a, 121b, 151a, 151b may extend from hub sections 120, 150. For example, a single hanger arm may laterally extend from one or two sides of a hub section e.g., a continuous arm that extends across the hub section. In another example, multiple hanger arms may extend from one side of a hub section and/or multiple hanger arms may extend from multiple sides of a hub section. When multiple arm hangers are attached to a hub section, the hanger arms will typically be linearly aligned or approximately linearly aligned to provide for simpler storage or transport. However, in one embodiment, a hub section may include hanger arms oriented at angles less than or greater than about 180°, such as about 220°, about 210°, about 200°, about 190°, about 170° about 160°, about 150°, about 140°, about 150°, about 140°, about 130°, about 120°, about 110°, about 100°, about 90°, about 80°, about 70°, about 60°, about 50°, about 40° or less, or within any range therebetween.

Figure 10:
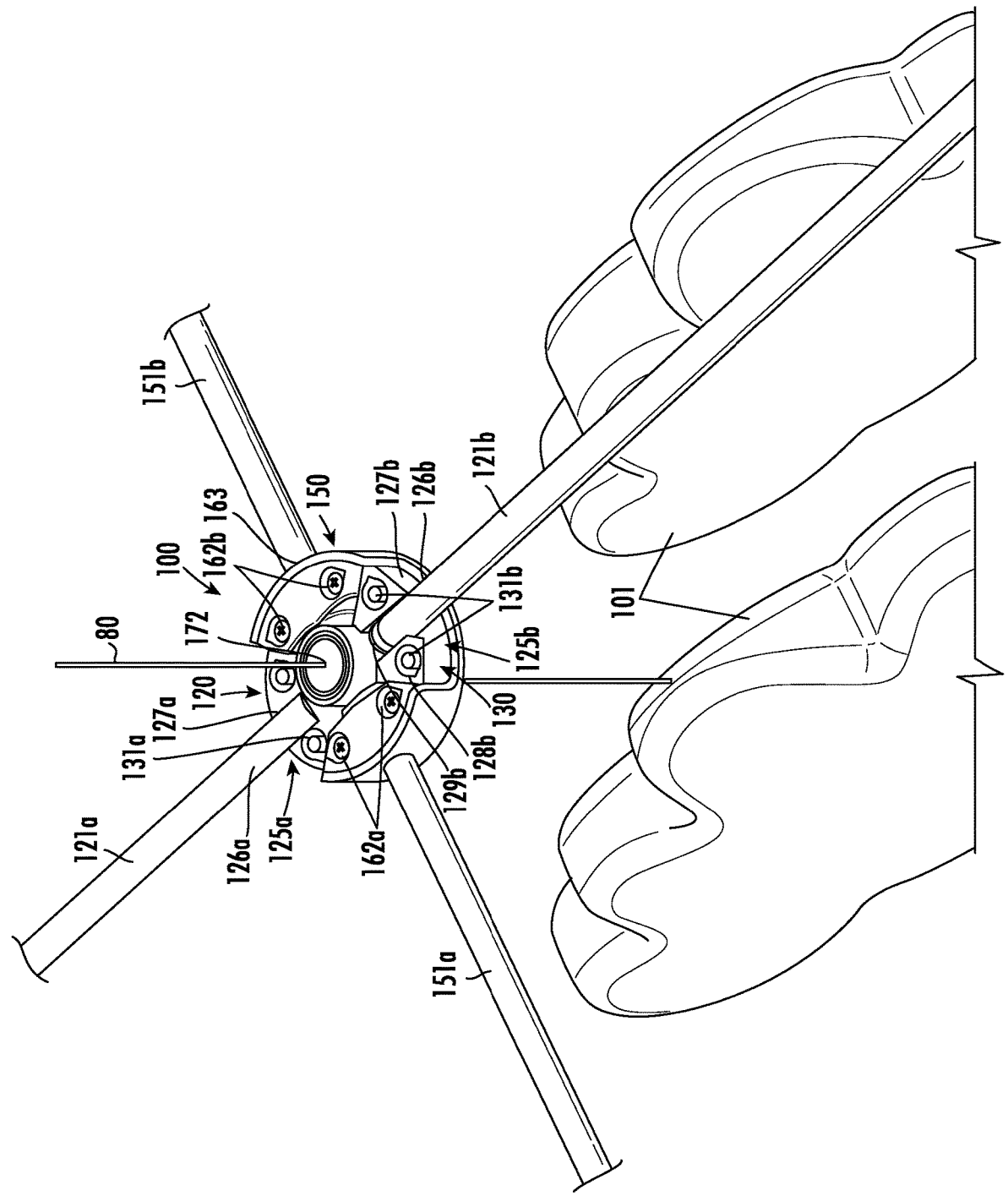
FIG. 10 is an overhead view of a mobile including a hub wherein a cover of a first hub section has been removed according to various embodiments described herein.

With further reference to FIG. 10, an inner end 126a, 126b of the hanger arm 121a, 121b may extend from a slot 127a, 127b through the side 125a, 125b of the first hub section 120. The hanger arm 121a, 121b may be secured in the slot 127a, 127b in any suitable manner, e.g., press-fit, snapped, clipped, clamped, threaded, or with another attachment structure. In the illustrated embodiment, the inner end 126a, 126b of the hanger arm 121a, 121b defines a groove 128b and an extension or rail 129b slots within the groove 128b to secure the hanger arm 121b. The groove 128b may extend completely around the inner end 126b or may be discontinuous. The rail 129b may be dimensioned to extend through all or a portion of the groove 128b. In one embodiment, the rail 129b includes multiple rail sections that slot into the groove 128b at multiple locations. In various embodiments, the second hub section 150 may be similarly arranged as described herein with respect to the first hub section 120. For example, inner ends of hanger arm 151a, 151b may be received and secured within slot 157a, 157b (see, e.g., FIG. 13).

The slot 127a, 127b extends through a fitting 130 configured to fittingly engage with a fitting 160 of the second hub section 150 to couple the first and second hub sections 120, 150. FIG. 10 illustrates the first hub section 120 with an outer portion 133 or cover removed from an upper portion of the fitting 130. The outer portion 133 may be attached to the fitting 130 or may comprise a unitary structure. As shown, the outer portion 133 is attachable to the fitting 130 via pins or screws 132a, 132b (see FIG. 11) through slots 131a, 131b wherein example screws 162a, 162b utilized to attach the outer portion 153 of the second hub section 150 are visible. Various attachment structures may also be used such as press-fittings, rails and groove, snaps, clips, clamps, adhesive.

Figure 11:
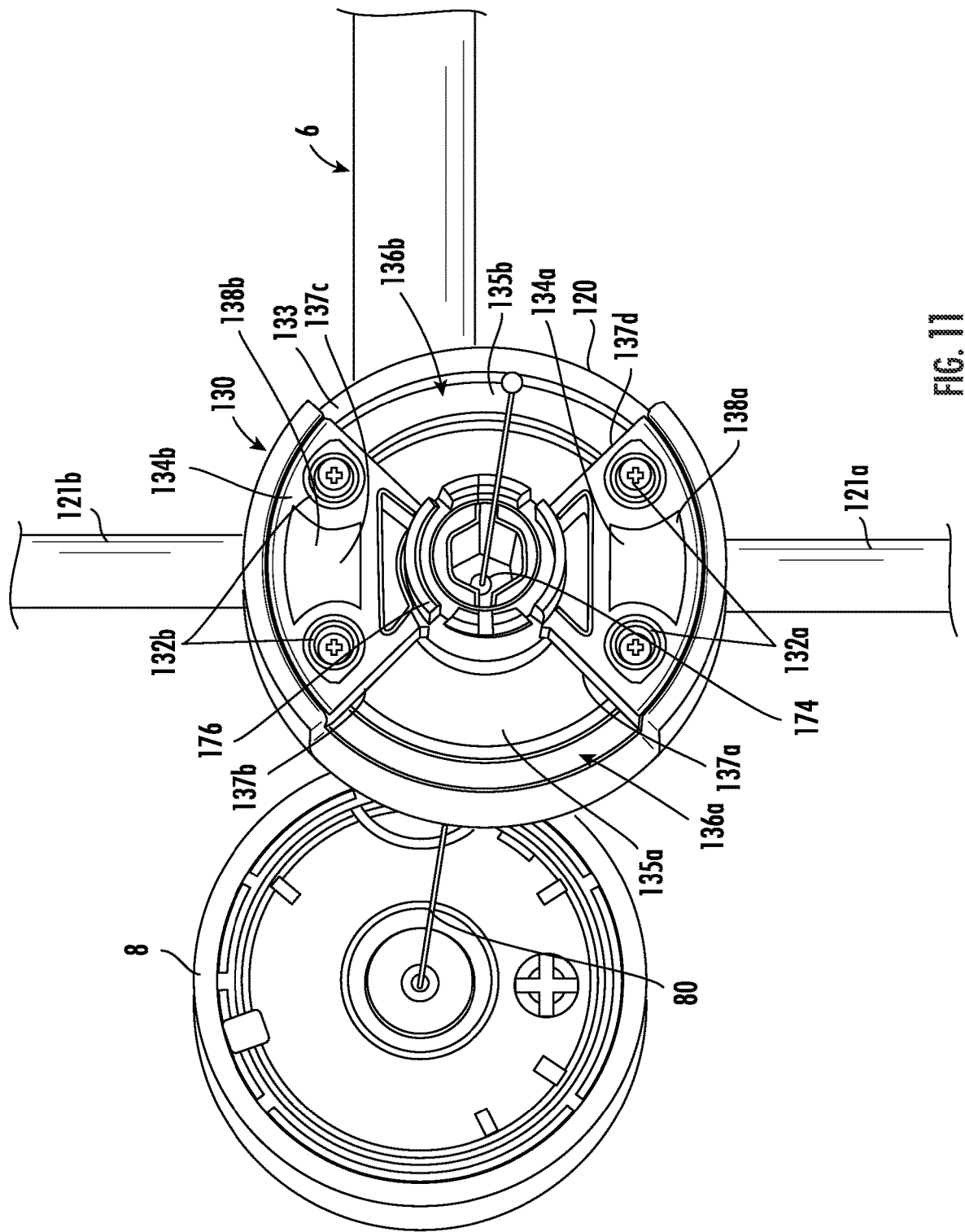
FIG. 11 is an underside view of a first hub section according to various embodiments described herein.
Figure 12:
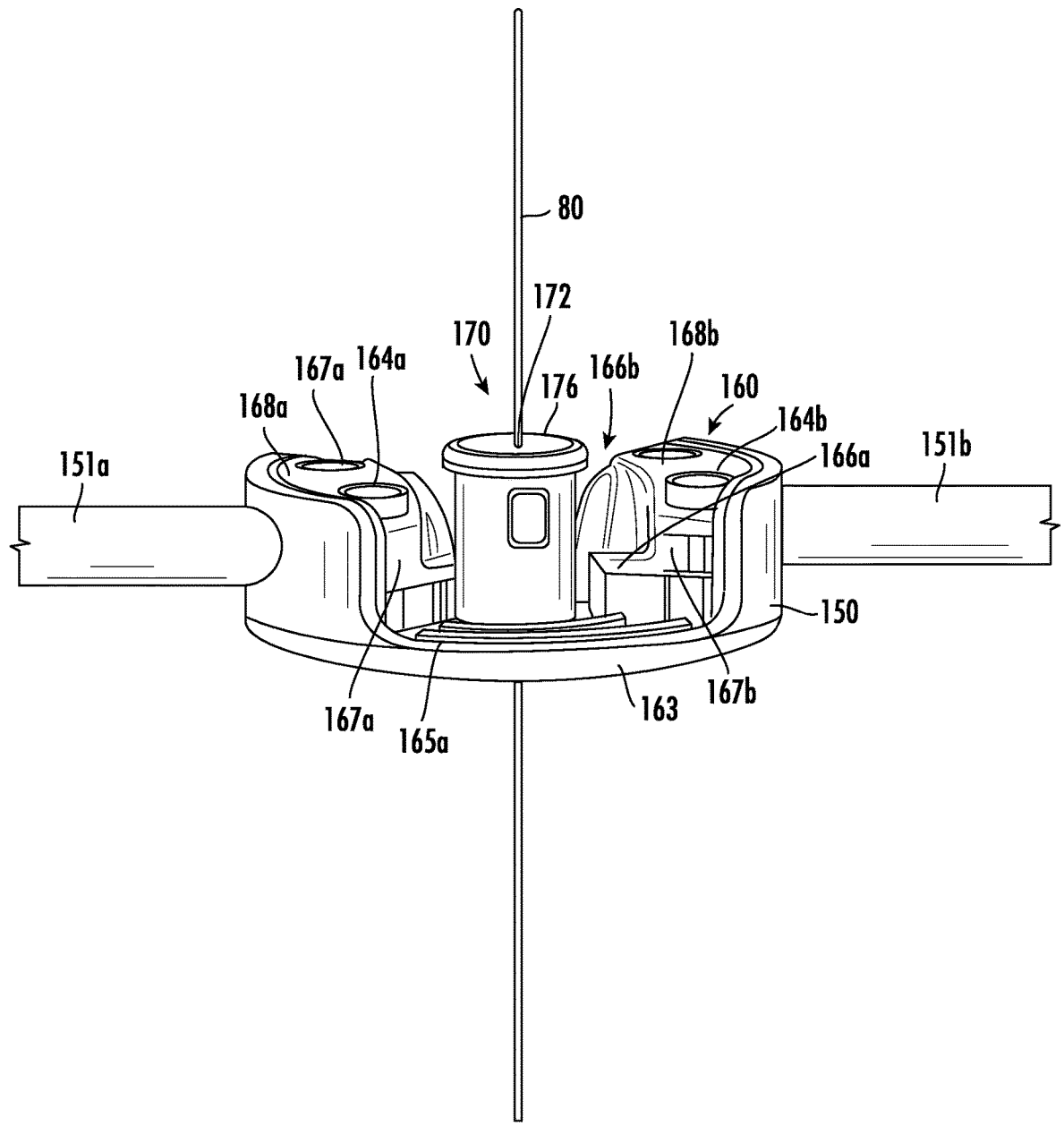
FIG. 12 is an elevated view side of a second hub section according to various embodiments described herein.
Figure 13:
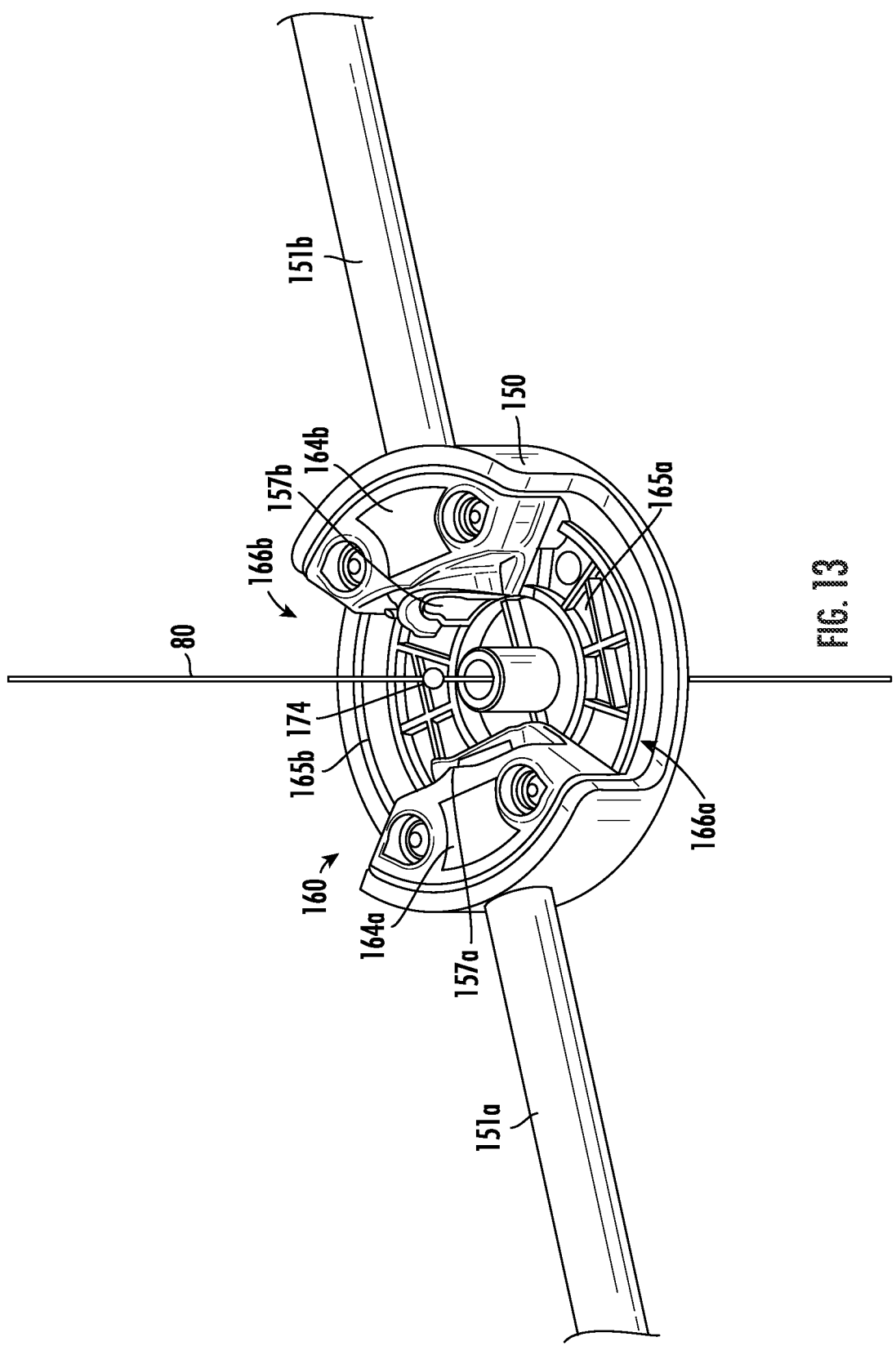
FIG. 13 is an elevated perspective view of a second hub section according to various embodiments described herein.
Figure 14:
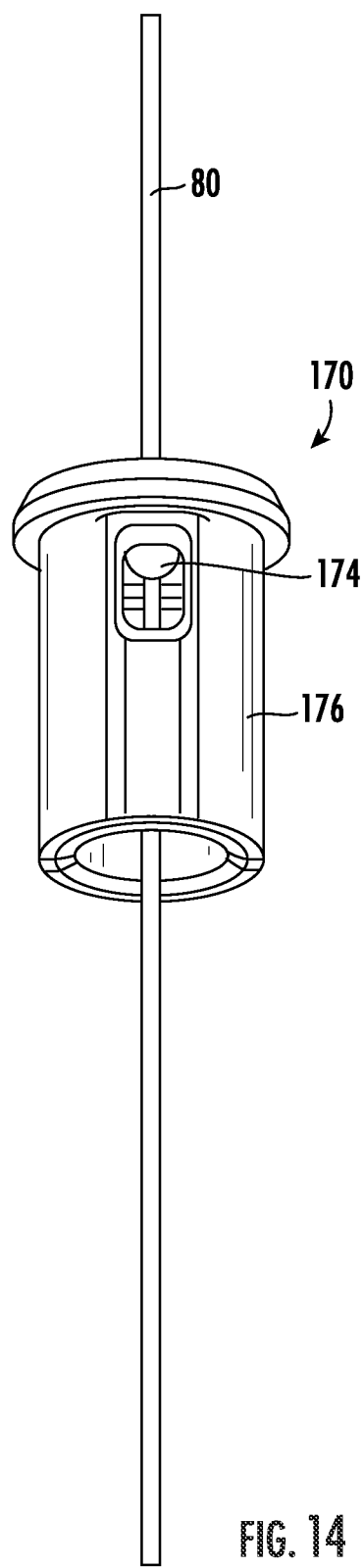
FIG. 14 is an elevated perspective view of an anchor housing according to various embodiments described herein.

With further reference to FIG. 11 showing a lower view of the first hub section 120 with the second hub section 150 removed and FIG. 12. showing an upper view of the second hub section 150 with the first hub section 120 removed, the respective fittings 130, 160. Various fitting configurations may be used. For example, the fittings 130, 160 may be configured to press-fit or couple along complementary portions. In some examples, the fittings 130, 160 may be snapped or clipped together. In one example, the rod, pin, or rail may extend from one of the hub sections 120, 150 and be received within a slot or groove of a fitting 130, 160 of another hub section 120, 150 to couple the hub sections 120, 150. A tab or push button actuator may be provided to remove or release the rod, pin, or rail. In some embodiments, the fittings 130, 160 may include a magnet along an interface of a fitting 130, 160 positioned to interface with another magnet or magnetic material along another fitting 130, 160 to assist in securing the hub sections 120, 150 when coupled.

In the illustrated embodiment, the fittings 130, 160 include one or more raised portions 134a, 134b, 164a, 164b. The raised portions 134a, 134b, 164a, 164b extend inwardly from the outer portions 133, 163 wherein notches 136a, 136b, 166a, 166b are defined adjacent to sides 137a, 137b, 137c, 137d, 167a, 167b, 167c, 167d of the raised portions 134a, 134b, 164a, 164b. While the illustrated hub sections 120, 150 include inner faces 135a, 135b, 165a, 165b of outer portions 133, 163 that extend between raised portions 134a, 134b, 164a (FIG. 13), 164b, in some embodiments, an outer portion 133, 163 does not extend between raised portions 134a, 134b, 164a, 164b of fittings 130, 160. The raised portions 134a, 134b, 164a, 164b raised relative to the lower portion or bases of the notches 136a, 136b, 166a, 166b, e.g., inner faces 135a, 135b, 165a, 165b, and those having skill in the art will appreciate that the raised portions 134a, 134b, 164a, 164b may be considered level or a base height and the notches 136a, 136b, 166a, 166b may be considered indentations or lower portions along the base of the notches 136a, 136b, 166a, 166b. Similarly, the lower portions of the notches 136a, 136b, 166a, 166b may be considered level or base height and the raised portions 134a, 134b, 164a, 164b may be considered protrusions extending from the lower portions of the notches 136a, 136b, 166a, 166b.

The raised portions 134a, 134b, 164a, 164b may be dimensioned to positioned within notches 136a, 136b, 166a, 166b to couple the first and second hub sections 120, 150. When coupled, one or more of the inner faces 135a, 135b, 165a, 165b may interface with corresponding upper surfaces 138a, 138b, 168a, 168b of the raised portions 134a, 134b, 164a, 164b. Additionally or alternatively, sides 137a, 137b, 137c, 137d of raised portions 134a, 134b may interface with sides 167a, 167b, 167c, 167d of raised portions 164a, 164b. In either or both configurations, interfacing surfaces may also engage along one or more portions thereof. In the illustrated embodiment, the raised portions 134a, 134b, 164a, 164b are wedge shaped and are dimensioned to be received within corresponding wedge shaped notches 136a, 136b, 166a, 166b. Other projection and notch type fitting configurations comprising projections and/or notches having different relative dimensions and/or shapes may also be used as well as other coupling structures. For example arcuate, square, rectangular, multi-sided, geometric and non-geometric shaped projections or notches may be used. The projections and notches will typically have complementary shaped structures along at least a portion of the fitting to provide an assembled fit. Notches and projections can be consistently shaped or different shaped and/or sized notches and projections can be provided along each complementary hub section 120, 150. In one embodiment, each hub section 120, 150 includes teeth or an array of notches and groove complementary to the other hub for fitting the sections together. In one embodiment, fittings include threads, clips, clamps, rail and groove, or other coupling structures that may be mated or otherwise coupled to couple the hub sections 120, 150. In one such example, the fittings do not include projections or raised portions. In one embodiment, the hub sections 120, 150 may mate by fitting one over the other and then clicking or snapping the sections together. Initial association of hub sections 120, 150 may be offset and the sections may be subsequently twisted to lock the sections together. Rail and groove structures may be provided along complementary fittings to assist in guiding the sections 120, 150 together.

As introduced above, in some embodiments, the fittings 130, 160 may include one or more magnets positioned along an interface of a fitting 130, 160, e.g., along one or more sides 167a, 167b, 167c, 167d of raised portions 164a, 164b, one or more sides 137a, 137b, 137c, 137d of raised portions 134a, 134b, and/or one or more inner faces 135a, 135b, 165a, 165b, that are positioned to interface with another magnet or magnetic material along another fitting 130, 160, e.g., along one or more sides 167a, 167b, 167c, 167d of raised portions 164a, 164b, one or more sides 137a, 137b, 137c, 137d of raised portions 134a, 134b, and/or one or more inner faces 135a, 135b, 165a, 165b, to assist in securing the hub sections 120, 150 when coupled.

In the embodiment illustrated, the hub sections 120, 150 include fittings 130, 160 configured to receive each other and remain coupled by gravity. When coupled, the hub sections 120, 150 may be decoupled, e.g., for storage, packaging, or travel, by lifting the first hub section 120 relative to the second hub section 150 to separate the two. The first hub section 120 or the second hub 150 section may then be rotated to align the hanger arms 121a, 121b, 151a, 151b. To couple the hub sections 120, 150, the first hub section 120 and the second hub section 150 may be rotated such that the raised portions 134a, 134b, 164a, 164b position over or under corresponding notches 136a, 136b, 166a, 166b. The first hub section 120 may then be released and the raised portions 134a, 134b, 164a, 164b may slide or gravitationally drop into the corresponding notches 136a, 136b, 166a, 166b of the opposed hub section 120, 150.

When coupled, the first and second hub sections 120, 150 may align along edges 139, 169 of outer portions 133, 153. In some embodiments, one or more rails and grooves may be provided along interfacing surfaces of edges 139, 169 or fittings 130, 160 to assist in alignment and clean fit when coupled. In some embodiments, the fittings 130, 160 may be configured to maintain coupling of the hub sections 120, 150 by gravity when the hub 100 is suspended from the connection line 80.

The mobile may include a line anchoring mechanism 170 configured to anchor the connection line 80 relative to the hub 100. For example, the line anchoring mechanism 170 may include structure that may be fixed or fixable to the connection line 80 that anchors the connection line 80 relative to the hub 100 such that the hub 100 may be suspended from the connection line 80.

Various line anchoring mechanisms 170 may be used. In some embodiments, the line anchoring mechanism 170 may comprise a hub structure upon which the connection line 80 may be tied, pinched, compressed, clipped, or welded. For example, a line anchoring mechanism 170 may include a loop positioned along the connection line 80 that may hook to a structure of on the hub 100. In another example, the line anchoring mechanism 170 includes a slot in the hub 100 through which the connection line may be inserted and held relative to the hub 100. For instance, the slot may define a gap having a decreasing width that the connection line 80 may be pulled into to pinch the connection line 80. In one example, the line anchoring mechanism 170 may include a clamp positioned on the hub 100 to clamp the connection line 80 at suitable location to stabilized the position of the hub 100 relative to the connection line 80. In another example, the line anchoring mechanism 170 includes a tie-on structure that the connection line 80 may be tied to.

With general reference to FIGS. 11-14, in various embodiments, the line anchoring mechanism 170 may comprise an orifice 172 in the hub 100 or other structure that may be fixed or fixable to the hub 100 for receiving the connection line 80. The orifice 172 may include a hole, slot, or other opening. The line anchoring mechanism 170 may also include a stopper 174 positioned along the connection line 80 that includes an enlarged dimension relative to a dimension of the orifice 172. When extended through the orifice 172, the enlarged dimension of the stopper 174 prevents the connection line 80 from being translated through the slot 172 beyond stopper 174 when the stopper 174 contacts the orifice 172. The orifice 172 or other structure for supporting the hub 100 on the stopper 174 will typically be on the second hub section 150 upon which the first hub section 120 seats or couples such that the second hub section 150 supports the first hub section 120 and the second hub section 150 is support on the stopper 174.

The stopper 174 may include a knot or an object fixed or fixable to the connection line 80, for example. In the illustrated embodiment, the stopper 174 comprises a ball shaped objected fixed along the connection line 80.

In some embodiments, the line anchoring mechanism 170 may allow the hub 100 to slide relative to the connection line 80. For example, an upper portion of the connection line 80 adjacent to stopper 174 may include a dimension less than that of the orifice 172 to allow the connection line 80 to translate through the orifice 172 until the stopper 174 engages the reduced dimension of the orifice 172. Some configurations may include a second orifice through which the connection line is received that limits a distance of upward travel of the hub 100 relative to the connection line 80. For example, the connection line 80 may be extended through two orifices such that the stopper 174 locates between an upper orifice defining a reduced dimension relative to the stopper 174, e.g., as described with respect to orifice 172, and a lower orifice also defining a reduced dimension relative to the stopper 174. The first hub section 120 may extend around the connection line 80. When decoupled from the second hub section 150, the first hub section 120 may be rotated around the connection line 80 to reorient the first hub section 120 relative to the second hub section 150, e.g., to align hanger arms 121a, 121b, 151a, 151b.

As introduced above, the stopper 174 may be statically, e.g., stationary, mounted along the connection line 80 at a fixed location. In a further embodiment, the stopper 174 may be configured to be adjustable such that the location of the stopper 174 along the connection line 80 may be adjusted by a user to adjust the location the hub 100 is supported along the connection line 80. For example, the connection line 80 may cross-loop through a slot that extends through the stopper 174 or the stopper 174 may be configured to adjustably pinch or crimp the connection line 80 to allow the stopper 174 location along the connection line 80 to be adjusted up or down.

In the illustrated embodiment, the line anchoring mechanism 170 also includes an optional anchor housing 176 comprising orifice 172 through which the connection line 80 extends. The stopper 174 positions within the anchor housing 176. The anchor housing 176 may attach to the second hub section 150 and position below the first hub section 120 when the hub sections 120, 150 are coupled. In the illustrated embodiment, the line anchoring mechanism 170 is configured to allow both the first and second hub sections 120, 150 to rotate around or relative to the connection line 80. In some embodiments, the second hub section 150 may rotationally fix to the connection line, e.g., the connection line my tie or tether to the second hub section 150, the second hub section may clamp or pinch the connection line 80, or the stopper 174 may be rotationally fixed to the connection line 80 and the orifice 172 or other structure of the second hub section 150 may attach to the stopper 174. In such configurations, when coupled to the second hub section 150, the first hub section 120 may be rotationally fixed relative to the connection line 80 via its coupling to the second connection line.

As noted above and elsewhere herein, the hub sections 120, 150 or fittings 130, 160 thereof may be configured to gravitationally mate along interfaces of the fittings 130, 160 to couple and/or maintain coupling of the hub sections 120, 150. In some embodiments, gravitational mating may be provided by anchorage of the second hub section 150 to a location along the connection line 80. For example, the line anchoring mechanism 170 may include an orifice 172 fixed to the second hub section 150, e.g., anchor housing 176 may attach to the second hub section 150, and the stopper 174 may be prevented from passing through the orifice 172, thereby anchoring the second hub section 150 relative to the connection line 80 at stopper 174 when suspended. The weight of the second hub section 150, hanger arms 151a, 151b, secondary hanger arms 154a, 154b, and/or mobile objects 101 may maintain the stopper against the orifice 172. As the first hub section 120 is attached to hanger arms 121a, 121b, secondary hanger arms 124a, 124b, and mobile objects 101, this weight pulls the first hub section 120 down onto the second hub section 150 to maintain the respective fittings 130, 160 in an interfaced configuration when the hub 100 is suspended unless the first hub section 120 is lifted from the second hub section 150. It will be appreciated, that in some embodiments, the hub sections 120, 150 may not gravitationally mate.

Figure 15A:
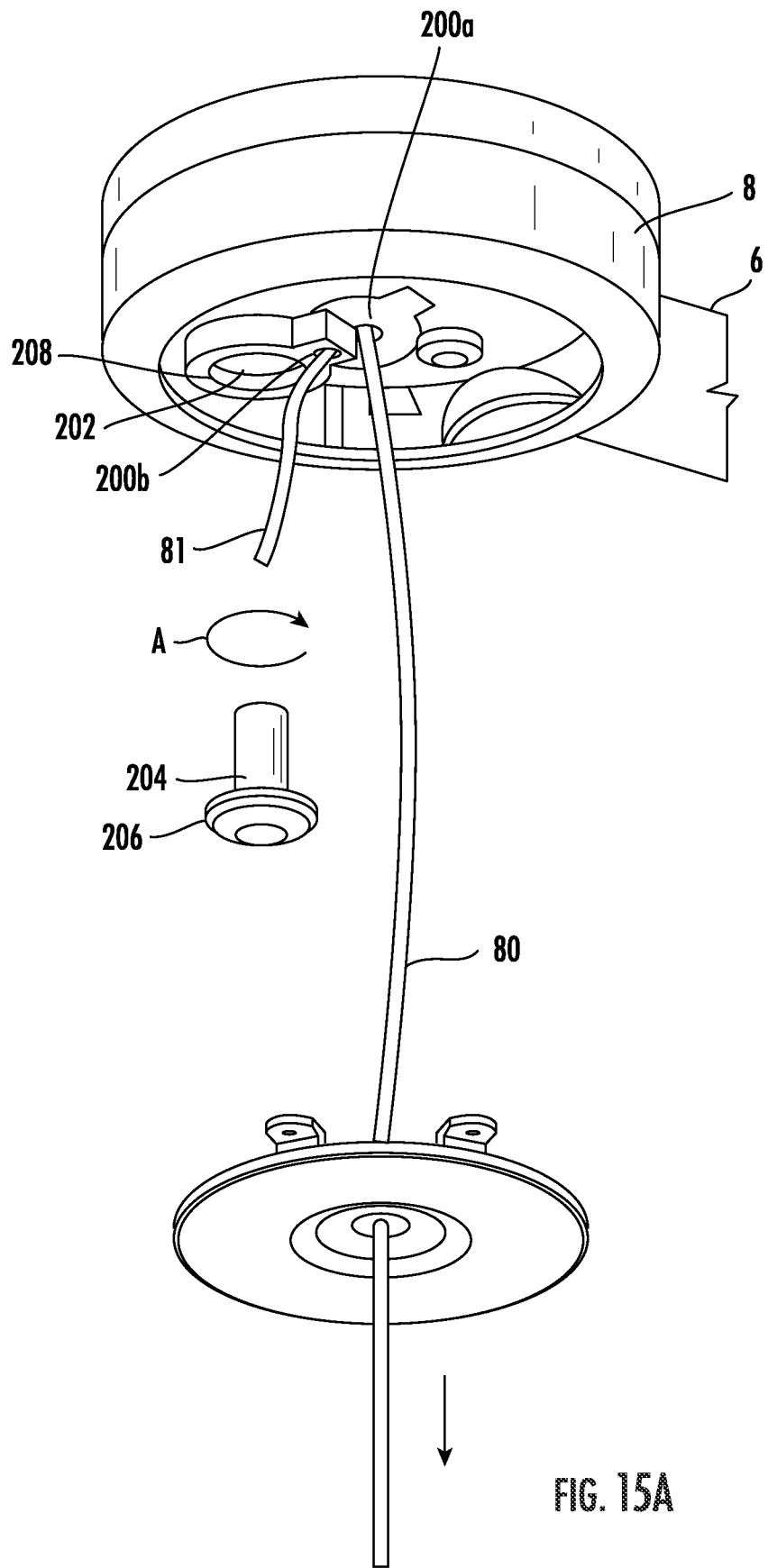
FIG. 15A illustrates an attachment point along an arm configured to removably attach a connection line and FIG. 15B illustrates direct attachment of the connection line to hanger hook according to various embodiments described herein.

As introduced above, the mobile 60a may be hung over a bedding area of a crib, bassinet, or play pin, for example. The mobile 60a may include a connection line 80 for attachment to an attachment point 8, which will typically be configured to support the weight of the mobile 60a at an overhanging position. Such an attachment point may include structures such as an arm, hook, rod, pin, clamp, latch, tie-off, loop, ceiling fixture, or other structure suitable to support the weight of the mobile 60a. FIG. 15A illustrates an embodiment of an attachment point 8 comprising slot 200 through which the connection line 80 may be extended. The slot 200 includes one or more openings 200a, 200b for threading the connection line 80 through the slot 200. An end 81 of the connection line 80 may be attached to the attachment point 8 by various methods. In the illustrated embodiment, the attachment point 8 is configured to compress the end 81 of the connection line 80 to attach the connection line to the attachment point 8. For example, a threaded or other slot 202 may be provided along the attachment point 8 for receiving a screw 204 or other structure configured to compress the attachment line when interfaced with the slot 202. As shown, the end 81 of the connection line may be positioned between flange 206 of screw 204 and a surface 208 extending around the slot 202 such that when the screw 204 is threaded (indicated by arrow A) into to the slot 202 the end 81 of the connection line 80 is compressed between the flange 206 and the surface 208. The connection line 80 may be removed by turning the screw 206 in the opposite direction to remove compression from the end 81 and then pulling the end 81 through the slot 200.

As introduced above, the end 81 of the connection line 80 may be attached to the attachment point 8 by various methods. For example, the end 81 may be attached to the connection line 80 extending from the first opening 200a of the slot 200 by a knot or crimp. The end 81 may be attached to another structure along the attachment point 8 with a knot or crimp. The end 81 of the connection line 80 may be enlarged, e.g., include a knot or object secured to the end 81, relative to the slot 200, first opening, 200a, and/or second opening 200b to prevent the end 81 from being removed from the slot 200 unless desired. In one example, an enlarged knot or object may be secured to the end 81 after threading through the slot 200. In some examples, the slot 200 may be defined by structures have a hinged connection, removable portion, or be configured to adjust a diameter of the slot 200 to receive and/or release the connection line 80 within or from the slot 200. The end 81 may be enclosed in the slot 200 or may extend from the second opening 200b, if present. When the end 81 includes an enlarged portion, a diameter of the slot 200 may be less than that of the enlarged portion to prevent the end 81 of the connection line 80 from being pulled through the slot 200 beyond the second end 200b and/or first end 200a.

Figure 15B:
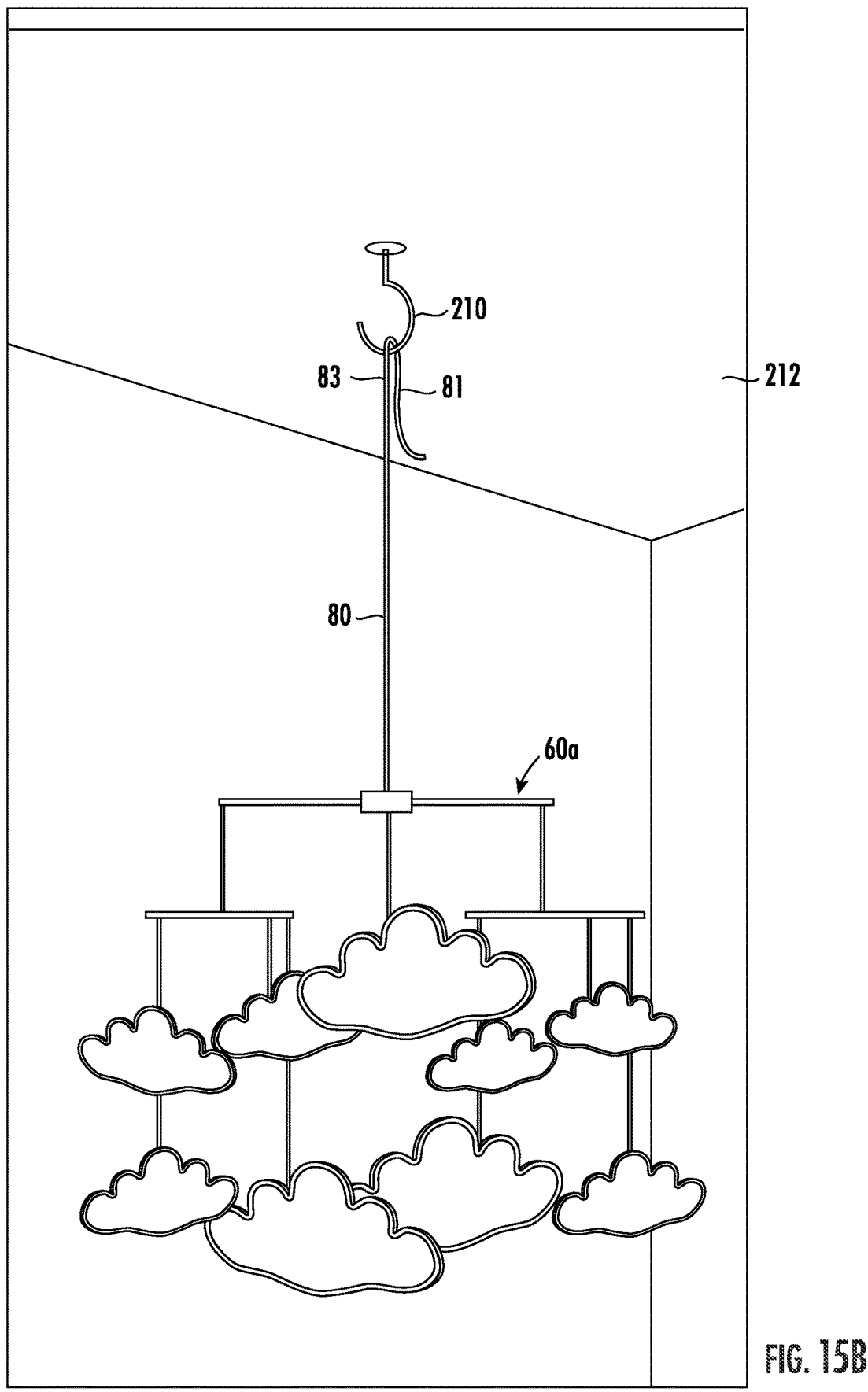

FIG. 15B illustrates the end 81 of the connection line 80 attached to hook 210 secured to a ceiling 212 wherein the end 81 is tied or knotted to form a loop 83 through which the hook 210 extends. Thus, the mobile 60a may be configured to selectably attach to multiple attachment structures to provide users flexibility with respect to locating the mobile 60a.

Figure 16A:
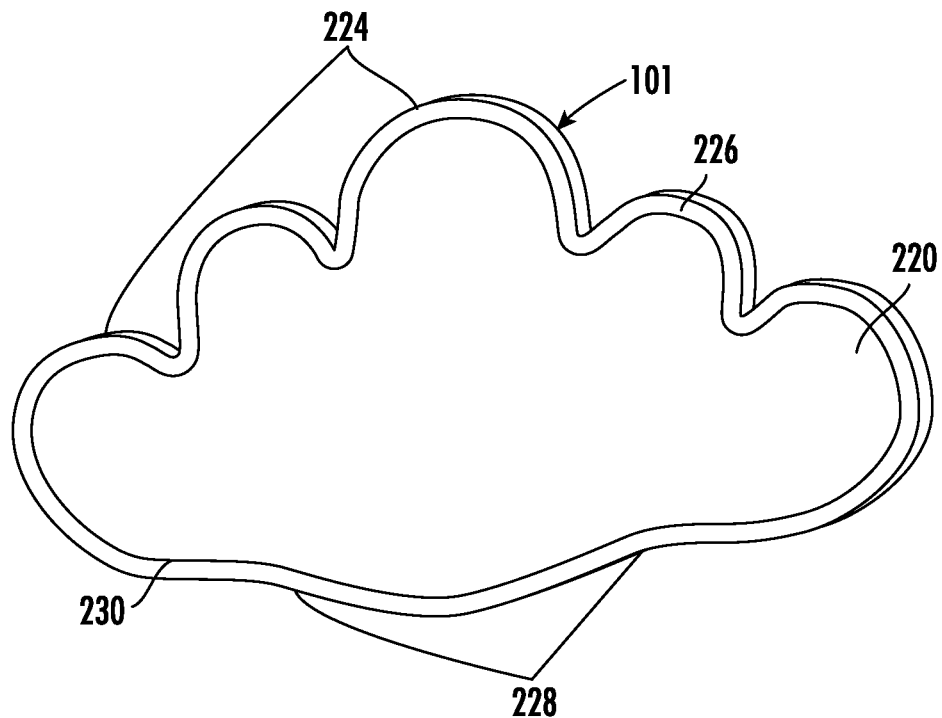
FIGS. 16A & 16B illustrate perspective views of a mobile object having a cloud shaped side profile according to various embodiments described herein.
Figure 16B:
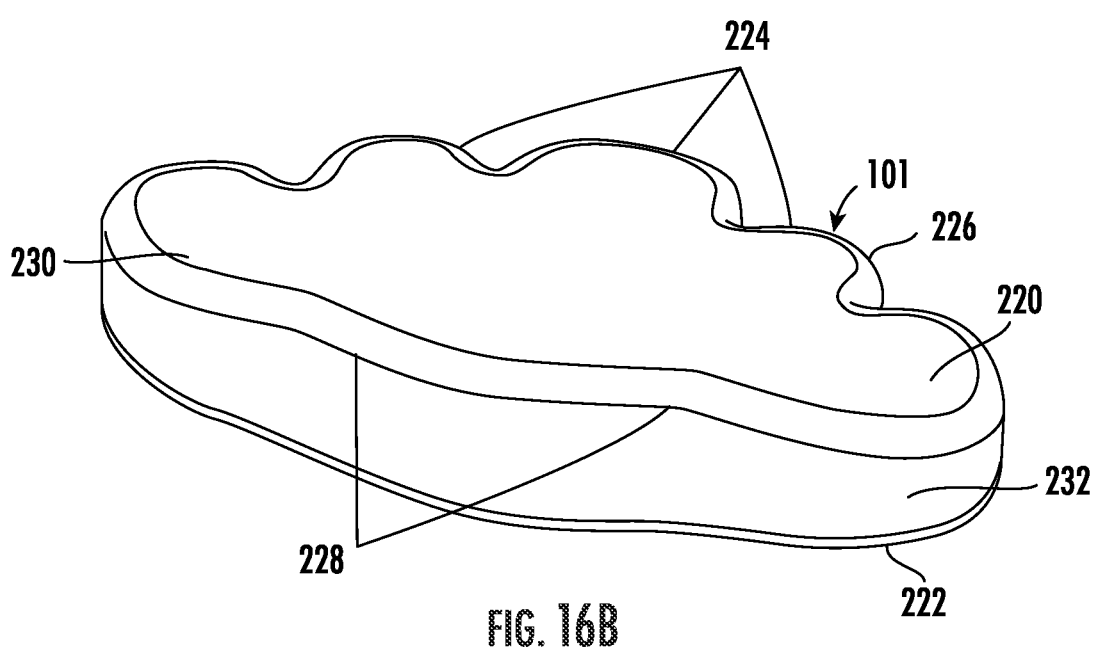

FIGS. 16A & 16B illustrate an example mobile object 101 for suspending from hanger arms. The mobile object 101 may be similar to those described above. The mobile object 101 has a cloud shaped profile along front 220 and rear faces 222, e.g., along its height and width dimensions. In other embodiments, the mobile object 101 may also define a cloud shaped profile along its depth dimension. The cloud shape includes a plurality of crescent projections 224 along an upper perimeter 226 and one or more subtle curves 228 (e.g., +/−30 degrees from linear) along a lower perimeter 230. Additional or fewer crescent projections 224 and/or additional or fewer subtle curves 228 may also be used. In one example, the lower perimeter 230 does not include subtle curves 228 and includes one or more crescent projections 224 or is linear.

Figure 17:
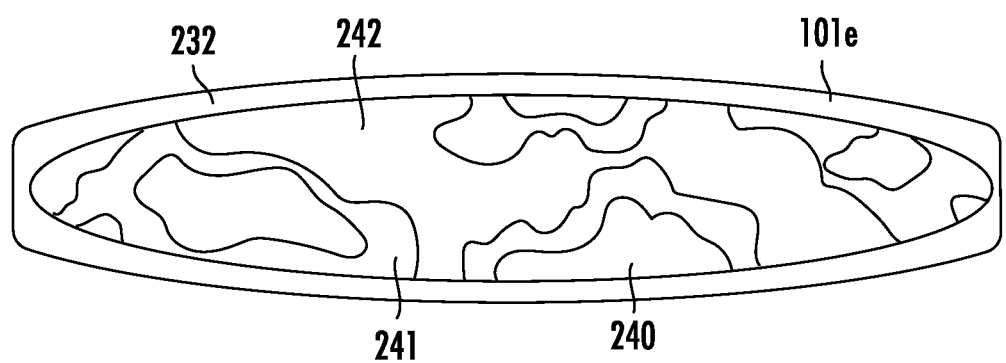
FIG. 17 illustrates a mobile object having a cloud shaped profile and a pattern along an underside of the object according to various embodiments described herein.

In various embodiments, mobile objects may include patterns inviting interests in babies located at various positions relative to the mobile. For example, an underside of a mobile object may include a colored and/or textured pattern. FIG. 17 illustrates a mobile object 101e shaped as described above with respect to FIGS. 16A & 16B wherein an underside 232 of the cloud shaped mobile object 101e includes a sky pattern, wherein the dark portions 240 are dark blue, gray portions 241 are light blue, and the white portions 242 are white. The sky pattern forms a relationship between the clouds shapes above the baby and a sky with clouds. Thus, the pattern may present a relationship to the baby between sky and clouds. When the baby is raised relative to the mobile objects, e.g., as arranged in FIGS. 6A & 6B, the perspective of the baby moves from looking up at a sky pattern with angled cloud faces to an elevated view of the clouds as if rising up into the sky. In various embodiments, the sky pattern or another pattern may be extended to lateral or upper sides of the mobile object 101e.

Figure 18:
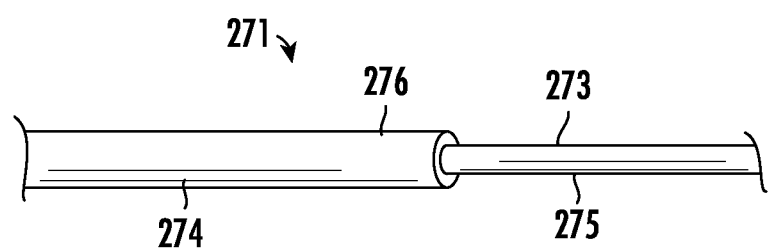
FIG. 18 illustrates a hanger arm construction for a mobile according to various embodiments described herein.

FIG. 18 illustrates a construction of a hanger arm 271 according to various embodiments described herein. The hanger arm 271 may be used as a hanger arm, which may be a secondary hanger arm, of any mobile, such as any of those described herein. Hanger arms are typically constructed from plastic or wood, however, such materials are susceptible to damage, bends, deformation, warping, breakage, or difficulty in manufacture. In various embodiments, hanger arms 271 may comprise a metal core 273 wrapped in a plastic cover 274. In the illustrated embodiment, the metal core 273 comprises a metal rod 275 and the plastic cover 274 comprises an extruded plastic tube 276. As metal is not baby friendly, the plastic tube 276 protects the baby from the metal rod 275 to allow the mobile to take advantage of the strength of metal.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification.

Various elements described herein have been described as alternatives or alternative combinations. It is to be appreciated that embodiments may include one, more, or all of any such elements. Thus, this description includes embodiments of all such elements independently and embodiments including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. A hub for a mobile, the hub comprising:
a hub comprising a first hub section and a second hub section;
the first hub section comprising a first fitting and configured to attach at least a first hanger arm to the hub; and
the second hub section comprising a second fitting and configured to attach at least a second hanger arm to the hub;
wherein the first and second fittings are configured to interface to couple and decouple the first and second hub sections.

2. The hub of claim 1, wherein the first and second hub sections are configured to decouple by lifting the first hub section from the second hub section to separate the two hub sections.

3. The hub of claim 1, wherein the first and second hub sections are configured to be coupled by aligning the first fitting over the second fitting and bringing the aligned first and second fittings together along an axis corresponding to the connection line when supporting the hub.

4. The hub of claim 3, wherein the first and second hub sections are configured to remain coupled by gravity when the hub is suspended by the connection line.

5. A hub for a mobile, the hub comprising:
a hub configured to be suspended from a connection line and comprising a first hub section and a second hub section;
the first hub section comprising a first fitting and configured to support at least a first hanger arm; and
the second hub section comprising a second fitting and configured to support at least a second hanger arm,
wherein the first and second fittings are configured to interface to couple and decouple the first and second hub sections, and
wherein the first and second hub sections each include an orifice through which the connection line extends.

6. The hub of claim 5, wherein, when decoupled, the first hub section is rotatable relative to the second hub section about the connection line.

7. A hub for a mobile, the hub comprising:
a hub configured to be suspended from a connection line and comprising a first hub section and a second hub section;
the first hub section comprising a first fitting and configured to support at least a first hanger arm; and
the second hub section comprising a second fitting and configured to support at least a second hanger arm,
wherein the first and second fittings are configured to interface to couple and decouple the first and second hub sections, and
wherein the first fitting includes a notch and a raised portion and the second fitting includes a notch complimentary to the raised portion of the first fitting and a raised portion complementary to the notch of the first fitting, and wherein the first fitting and second fitting are configured to couple and decouple by interfacing the respective raised portions and notches of the first and second fittings.

8. The hub of claim 7, wherein the raised portion of the first fitting is wedge shaped and the notch portion of the second fitting has a wedge shape complementary to the wedge shape of the first fitting.

9. A hub for a mobile, the hub comprising:
a hub configured to be suspended from a connection line and comprising a first hub section and a second hub section;
the first hub section comprising a first fitting and configured to support at least a first hanger arm; and
the second hub section comprising a second fitting and configured to support at least a second hanger arm,
wherein the first and second fittings are configured to interface to couple and decouple the first and second hub sections, and
wherein the hub further comprises a line anchoring mechanism for anchoring the first and second hub sections relative to a connection line from which the hub section may be suspended.

10. The hub of claim 9, wherein the line anchoring mechanism includes an orifice through which the connection line extends, wherein the connection line includes a stopper positioned along the connection line, and wherein the orifice has a smaller cross-section dimension than the stopper to prevent the larger cross-section dimension of the stopper from being pulled through the smaller cross-section dimension of the orifice.

11. The hub of claim 10, wherein the line anchoring mechanisms includes a housing, wherein the housing removably attachable directly to the second hub section, and wherein the housing includes the orifice having the smaller cross-section than the stopper.

12. A mobile comprising:
a vertically extending connection line;
a hub configured to be suspended from the connection line and comprising a first hub section and a second hub section, the connection line passing through the hub;
the first hub section comprising a first fitting and configured to support at least a first hanger arm;
the second hub section comprising a second fitting and configured to support at least a second hanger arm,
wherein the first and second fittings are configured to interface to couple and decouple the first and second hub sections;
a first accessory line extending from the first hanger arm and a second accessory line extending from the second hanger arm;
one or more mobile objects directly or indirectly suspended from the first accessory line; and
one or more mobile objects directly or indirectly suspended from the second accessory line.

13. The mobile of claim 12, wherein the first and second hub sections are configured to decouple by lifting the first hub section from the second hub section to separate the two hub sections.

14. The mobile of claim 12, wherein the first and second hub sections are configured to be coupled by aligning the first fitting over the second fitting and bringing the aligned first and second fittings together along an axis corresponding to the connection line when supporting the hub.

15. The mobile of claim 14, wherein the first and second hub sections are configured to remain coupled by gravity when the hub is suspended by the connection line.

16. A mobile comprising:
a connection line;
a hub configured to be suspended from the connection line and comprising a first hub section and a second hub section;
the first hub section comprising a first fitting and configured to support at least a first hanger arm;
the second hub section comprising a second fitting and configured to support at least a second hanger arm,
wherein the first and second fittings are configured to interface to couple and decouple the first and second hub sections;

a first accessory line extending from the first hanger arm and a second accessory line extending from the second hanger arm;

one or more mobile objects directly or indirectly suspended from the first accessory line; and one or more mobile objects directly or indirectly suspended from the second accessory line, wherein the first fitting includes a notch and a raised portion and the second fitting includes a notch complimentary to the raised portion of the first fitting and a raised portion complementary to the notch of the first fitting, and wherein the first fitting and second fitting are configured to couple and decouple by interfacing the respective raised portions and notches of the first and second fittings.

17. The mobile of claim 16, wherein the raised portion of the first fitting is wedge shaped and the notch portion of the second fitting has a wedge shape complementary to the wedge shape of the first fitting.

18. A mobile comprising:

a connection line;

a hub configured to be suspended from the connection line and comprising a first hub section and a second hub section;

the first hub section comprising a first fitting and configured to support at least a first hanger arm;

the second hub section comprising a second fitting and configured to support at least a second hanger arm, wherein the first and second fittings are configured to interface to couple and decouple the first and second hub sections;

a first accessory line extending from the first hanger arm and a second accessory line extending from the second hanger arm;

one or more mobile objects directly or indirectly suspended from the first accessory line; and one or more mobile objects directly or indirectly suspended from the second accessory line, wherein the hub further comprises a line anchoring mechanism for anchoring the first and second hub sections relative to a connection line from which the hub section may be suspended, the line anchoring mechanism comprising an orifice through which the connection line extends, wherein the connection line includes a stopper positioned along the connection line, wherein the orifice has a smaller cross-section dimension than the stopper to prevent the larger cross-section dimension of the stopper from being pulled through the smaller cross-section dimension of the orifice, wherein the line anchoring mechanisms includes a housing removably attachable directly to the second hub section, and wherein the housing includes the orifice having the smaller cross-section than the stopper.

19. A hub for a mobile, the hub comprising:

a hub configured to be suspended from a connection line and comprising a first hub section and a second hub section;

the first hub section comprising a first fitting and configured to support at least a first hanger arm; and the second hub section comprising a second fitting and configured to support at least a second hanger arm, wherein the first and second fittings are configured to interface to couple and decouple the first and second hub sections, and wherein the first hub section positions below the second hub section when coupled and supports the second hub section thereon.

20. The hub of claim 19, wherein, when the hub is suspended from the connection line, the first hub section is decouplable from the second hub section by lifting the second hub section directly from the first hub section to separate the first and second fittings.

21. The hub of claim 19, wherein the first and second fittings are configured to gravitationally mate to couple the first and second hub sections.

* * * * *